(12) United States Patent
Jungklaus et al.

(10) Patent No.: US 10,000,048 B2
(45) Date of Patent: *Jun. 19, 2018

(54) TAPING TOOL HAVING IMPROVED TAPE ADVANCE

(71) Applicants: AXIA ACQUISITION CORPORATION, Duluth, GA (US); GRACO INC., Minneapolis, MN (US)

(72) Inventors: Matthew W. Jungklaus, Lawrenceville, GA (US); Steven J. Wrobel, Rogers, MN (US); Jeromy D. Horning, Albertville, MN (US)

(73) Assignees: AXIA ACQUISITION CORPORATION, Duluth, GA (US); GRACO INC., Minneapolis, MN (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/174,734

(22) Filed: Jun. 6, 2016

(65) Prior Publication Data

US 2016/0279919 A1   Sep. 29, 2016

Related U.S. Application Data

(63) Continuation-in-part of application No. 14/219,806, filed on Mar. 19, 2014, now Pat. No. 9,359,777.

(Continued)

(51) Int. Cl.
*B29C 65/52* (2006.01)
*B29C 65/54* (2006.01)
(Continued)

(52) U.S. Cl.
CPC .............. *B32B 37/12* (2013.01); *B32B 37/14* (2013.01); *B65H 35/002* (2013.01);
(Continued)

(58) Field of Classification Search
USPC ........................ 156/526, 574, 575, 577, 579
See application file for complete search history.

(56) References Cited

U.S. PATENT DOCUMENTS

| 2,323,963 A | 7/1943 | Ames |
| 2,502,499 A | 4/1950 | Ames |
| (Continued) | | |

FOREIGN PATENT DOCUMENTS

| CA | 1244801 A1 | 11/1998 |
| EP | 1757752 A2 | 2/2007 |
| GB | 800333 | 8/1958 |

OTHER PUBLICATIONS

Tapepro Drywall Tools, Tapepro Automatic Taper, Internet website (www.tapepro.com.au), Oct. 31, 2010.

(Continued)

*Primary Examiner* — Sing P Chan
(74) *Attorney, Agent, or Firm* — Michael Best & Friedrich LLP

(57) ABSTRACT

A taping apparatus includes an elongate body portion having a moveable control member for controlling the advancement of tape and a head portion connected to the elongate body portion for advancing the tape. The head portion includes a first stop, a second stop, a guide extending from the first stop to the second stop, and a tape advance mechanism moveable along the guide. The tape advance mechanism and the control member are coupled to one another such that the tape advance mechanism is moveable in response to movement of the control member. The tape advance mechanism includes a rotatable cam and a needle that rotates with the cam.

24 Claims, 15 Drawing Sheets

Related U.S. Application Data which is a continuation of application No. 13/151,252, filed on Jun. 1, 2011, now abandoned.

(60) Provisional application No. 61/350,455, filed on Jun. 1, 2010.

(51) Int. Cl.

| | | |
|---|---|---|
| *B32B 37/12* | (2006.01) | |
| *B32B 38/18* | (2006.01) | |
| *B32B 43/00* | (2006.01) | |
| *B44C 7/00* | (2006.01) | |
| *B44C 7/02* | (2006.01) | |
| *B44C 7/04* | (2006.01) | |
| *B44C 7/06* | (2006.01) | |
| *B44C 7/08* | (2006.01) | |
| *B32B 37/14* | (2006.01) | |
| *B65H 35/00* | (2006.01) | |
| *E04F 21/165* | (2006.01) | |
| *E04F 21/02* | (2006.01) | |

(52) U.S. Cl.
CPC ..... *B65H 35/0053* (2013.01); *B65H 35/0086* (2013.01); *E04F 21/026* (2013.01); *E04F 21/1657* (2013.01); *B32B 2405/00* (2013.01); *B32B 2419/00* (2013.01); *Y10T 156/10* (2015.01); *Y10T 156/1002* (2015.01); *Y10T 156/1052* (2015.01); *Y10T 156/12* (2015.01); *Y10T 156/17* (2015.01); *Y10T 156/179* (2015.01); *Y10T 156/1795* (2015.01); *Y10T 156/1798* (2015.01); *Y10T 156/18* (2015.01)

(56) References Cited

U.S. PATENT DOCUMENTS

| | | | |
|---|---|---|---|
| 2,815,142 A | 12/1957 | Ames | |
| 3,116,195 A | 12/1963 | Lathrop et al. | |
| 3,404,060 A | 10/1968 | Taylor, Jr. | |
| 3,880,701 A | 4/1975 | Moree | |
| 4,003,781 A | 1/1977 | Holsten | |
| 4,080,240 A * | 3/1978 | Dysart | B44C 7/06 156/575 |
| 4,086,121 A | 4/1978 | Ames | |
| 4,090,914 A | 5/1978 | Hauk et al. | |
| 4,105,490 A | 8/1978 | Lass | |
| 4,127,434 A | 11/1978 | Lass | |
| 4,208,239 A | 6/1980 | Lass | |
| 4,358,337 A | 11/1982 | Johnson et al. | |
| 4,452,663 A | 6/1984 | Heaton | |
| 4,555,298 A * | 11/1985 | Boucher | B44C 7/06 156/523 |
| 4,707,202 A | 11/1987 | Sweeny | |
| 4,828,647 A | 5/1989 | Eccleston | |
| 6,209,609 B1 * | 4/2001 | Edwards | B65H 35/0033 156/577 |
| 6,382,922 B1 | 5/2002 | Lewis et al. | |
| 6,412,138 B1 | 5/2002 | MacMillan | |
| 6,565,252 B2 | 5/2003 | Dillinger et al. | |
| 6,874,557 B2 | 4/2005 | Jungklaus | |
| 7,325,582 B2 * | 2/2008 | Smythe | E04F 21/165 156/527 |
| 7,621,309 B1 | 11/2009 | Mondloch et al. | |
| 7,624,782 B2 | 12/2009 | Jungklaus et al. | |
| 7,628,295 B2 | 12/2009 | Mondloch et al. | |
| 7,798,194 B2 | 9/2010 | Jungklaus | |
| 7,823,617 B2 * | 11/2010 | Smythe | B44D 3/38 156/526 |
| 8,783,322 B2 * | 7/2014 | Jungklaus | B65H 35/0053 156/575 |
| 8,863,807 B2 * | 10/2014 | Jungklaus | B65H 35/0053 156/575 |
| 9,359,777 B2 * | 6/2016 | Jungklaus | E04F 21/1657 |
| 2001/0003563 A1 | 6/2001 | Schauer et al. | |
| 2003/0138569 A1 | 7/2003 | Dillinger | |
| 2004/0211525 A1 | 10/2004 | Boutin | |
| 2004/0216847 A1 | 11/2004 | Hall et al. | |
| 2005/0051278 A1 | 3/2005 | Dobson | |
| 2006/0219366 A1 * | 10/2006 | Smythe | B44D 3/38 156/574 |
| 2007/0044923 A1 * | 3/2007 | Jungklaus | B65H 35/0053 156/575 |
| 2007/0215289 A1 | 9/2007 | Kennedy | |
| 2011/0290425 A1 * | 12/2011 | Jungklaus | B65H 35/0053 156/443 |
| 2011/0290426 A1 * | 12/2011 | Jungklaus | B65H 35/0053 156/578 |
| 2011/0297302 A1 * | 12/2011 | Jungklaus | B65H 35/0053 156/196 |
| 2014/0283997 A1 * | 9/2014 | Jungklaus | B65H 35/0053 156/443 |
| 2016/0279919 A1 * | 9/2016 | Jungklaus | E04F 21/026 |

OTHER PUBLICATIONS

PCT International Search Report and Written Opinion for PCT Application No. PCT/US2011/038831 dated Apr. 24, 2012 (12 pages).

\* cited by examiner

TAPING TOOL HAVING IMPROVED TAPE ADVANCE

FIELD OF THE INVENTION

The present invention relates, generally, to the field of tools for applying tape over gaps, seams, or joints between construction materials.

BACKGROUND

Today, many construction materials come in the form of substantially planar panels or rolls which are unrollable into, essentially, planar panels. The construction materials are, in both cases, secured with appropriate fasteners and/or adhesives to the framing members, sheathing and/or decking of building walls, floors, ceilings and roofs. Such construction materials comprise, without limitation: (a) drywall, gypsum board, plasterboard, cement board, greenboard, blueboard, wood, and foam board for use in forming interior, and in some cases exterior, building walls and/or ceilings; (b) felt paper, underlayments, membranes, wraps, and other similar materials that are generally applied to sheathing and/or decking to protect underlying building materials from the effects of weather, to reduce the amount of air and/or moisture infiltration through a building's structure, and/or to provide insulation against heat and sound transmission; and (c) other similar construction materials. The term "wallboard" is used herein to mean and refer, collectively, to such construction materials.

When individual panels or unrolled rolls of such wallboard are positioned side-by-side in/on a building structure as is often the case, the panels or unrolled rolls define gaps, seams or joints therebetween and are joined together with tape, sealant, filler and/or adhesive substances to form a monolithic structure. The tape may be manufactured from paper, fiberglass, or other material, be woven or non-woven, and be or not be backed with an adhesive substance. The sealant, filler and/or adhesive substances may include, but not be limited to, drywall compound, glue, caulk, resin, epoxy, and other similar substances that are collectively referred to herein by the term "mastic". The tape and mastic may be used alone or in combination to seal, fill and/or hide the gaps, seams or joints and secure the individual panels or unrolled rolls together. When the tape and mastic are used in combination to hide a joint between wallboard members, the mastic aids in securing the tape to the wallboard.

The tape and mastic may be applied manually through use of appropriate hand tools. However, in building structures where a large number of gaps, seams or joints are present, the manual application of tape and mastic can consume a large amount of time and can have a potentially adverse impact on construction schedules. Therefore, to reduce the amount of time required to finish the gaps, seams and/or joints, a taping tool that aids in applying tape and/or mastic over the gaps, seams and/or joints may be utilized.

At least one manufacturer supplies a taping tool for use in applying tape and mastic to gaps, seams and joints between wallboard members. The manufacturer's taping tool has a creaser wheel that attempts to crease the tape along the tape's longitudinal axis as the tape exits the tool, thereby improving the tape's application to joints and, in particular, to joints forming inside corners. The taping tool also has a mechanism for advancing tape from a spool as the tape is applied to gaps, seams and/or joints.

Unfortunately, the position of the creaser wheel can be difficult to control and can require the taping tool's user to move his/her hands into different positions on the tool in order to cause and control movement of the creaser wheel. The necessity of such movement makes the taping tool difficult to use effectively. Additionally, the mechanism for advancing tape from the taping tool is complex and difficult to configure for use, and can be easily knocked out of configuration by rough handling of the tool as is prone to occur on a construction job site. In addition, the taping tool has significant length and can be awkward and difficult to manipulate into a desired position relative to a hard to reach gap, seam or joint to which a user is attempting to apply tape.

Therefore, there is a need in the industry for apparatuses and methods for applying tape and/or mastic to gaps, seams and/or joints between wallboard members that address the above-identified problems and, and that may address other problems, difficulties, and/or shortcomings of current technology that may or may not be described herein.

SUMMARY

Briefly described, the present invention comprises a taping tool, including apparatuses and methods, for taping gaps, seams, and/or joints between wallboard members that includes an improved tape advance/actuation assembly. According to an example embodiment and without limitation, the taping tool has an elongate body portion having first and second ends and a control member of the tape advance/actuation assembly that is movable in both directions along a longitudinal axis extending between the first and second ends. The taping tool also has a head portion connected to the body portion that includes various components of the tape advance/actuation assembly and directs dispensed tape toward a gap, seam or joint between wallboard members. The head portion houses a tape engagement member of the tape advance/actuation assembly that moves in substantial unison with the control member and that engages or disengages the tape depending at least in part on the position of the control member. The tape engagement member engages or disengages the tape by rotation. When the tape engagement member is disengaged from the tape, tape may be dispensed freely from the taping tool. When the tape engagement member is engaged with the tape, tape may be advanced through the taping tool and into position to begin application. The extent of the engagement between the tape engagement member and the tape may be adjusted though manipulation of a single fastener.

Advantageously, the tape advance/actuation assembly of the taping tool is simple to operate and is substantially impervious to the hazards of a construction environment, thereby resolving many issues with earlier taping tools. Also, the tape advance/actuation assembly requires little adjustment to operate effectively and consistently. By virtue of a single fastener being used to adjust the extent of engagement between the tape and the tape engagement member, adjustment of the tape advance/actuation assembly is quick and easy.

In one embodiment, a taping apparatus includes an elongate body portion having a moveable control member for controlling the advancement of tape and a head portion connected to the elongate body portion for advancing the tape. The head portion includes a first stop, a second stop, a guide extending from the first stop to the second stop, and a tape advance mechanism moveable along the guide. The tape advance mechanism and the control member are coupled to one another such that the tape advance mechanism is moveable in response to movement of the control member. The tape advance mechanism includes a rotatable cam and a needle that rotates with the cam.

In another embodiment, a taping apparatus includes an elongate body portion having a moveable control member for controlling the advancement of tape and a head portion connected to the elongate body portion for advancing the tape. The head portion includes a guide and a tape advance mechanism moveable along the guide. The tape advance mechanism and the control member are coupled to one another such that the tape advance mechanism is moveable in response to movement of the control member. The tape advance mechanism includes a rotatable cam, a needle holder secured to the cam, and a needle secured to the needle holder such that the needle rotates with the cam.

In another embodiment, a taping apparatus includes an elongate body portion having a moveable control member for controlling the advancement of tape and a head portion connected to the elongate body portion for advancing tape. The head portion includes a first stop, a second stop, a guide extending from the first stop to the second stop, and a tape advance mechanism moveable along the guide. The tape advance mechanism and the control member are coupled to one another such that the tape advance mechanism is moveable in response to movement of the control member. The tape advance mechanism includes a body, a cam rotatably coupled to the body, a needle holder secured to the cam, and a needle secured to the needle holder such that the needle rotates with the cam.

In yet another embodiment, a needle holder for a tape advance mechanism includes a body coupleable to the tape advance mechanism. The body includes an opening positioned at a first end of the body. The opening is for receiving a needle. When a needle is positioned in the opening, a longitudinal axis of the needle and a longitudinal axis of the needle holder are parallel. The needle holder also includes a grip at a second end of the body. The second end of the body is opposite the first end of the body and is spaced from the first end of the body along the longitudinal axis of the needle holder.

Other advantages and benefits of the present invention will become apparent upon reading and understanding the present specification when taken in conjunction with the appended drawings.

DETAILED DESCRIPTION

Figure 1:
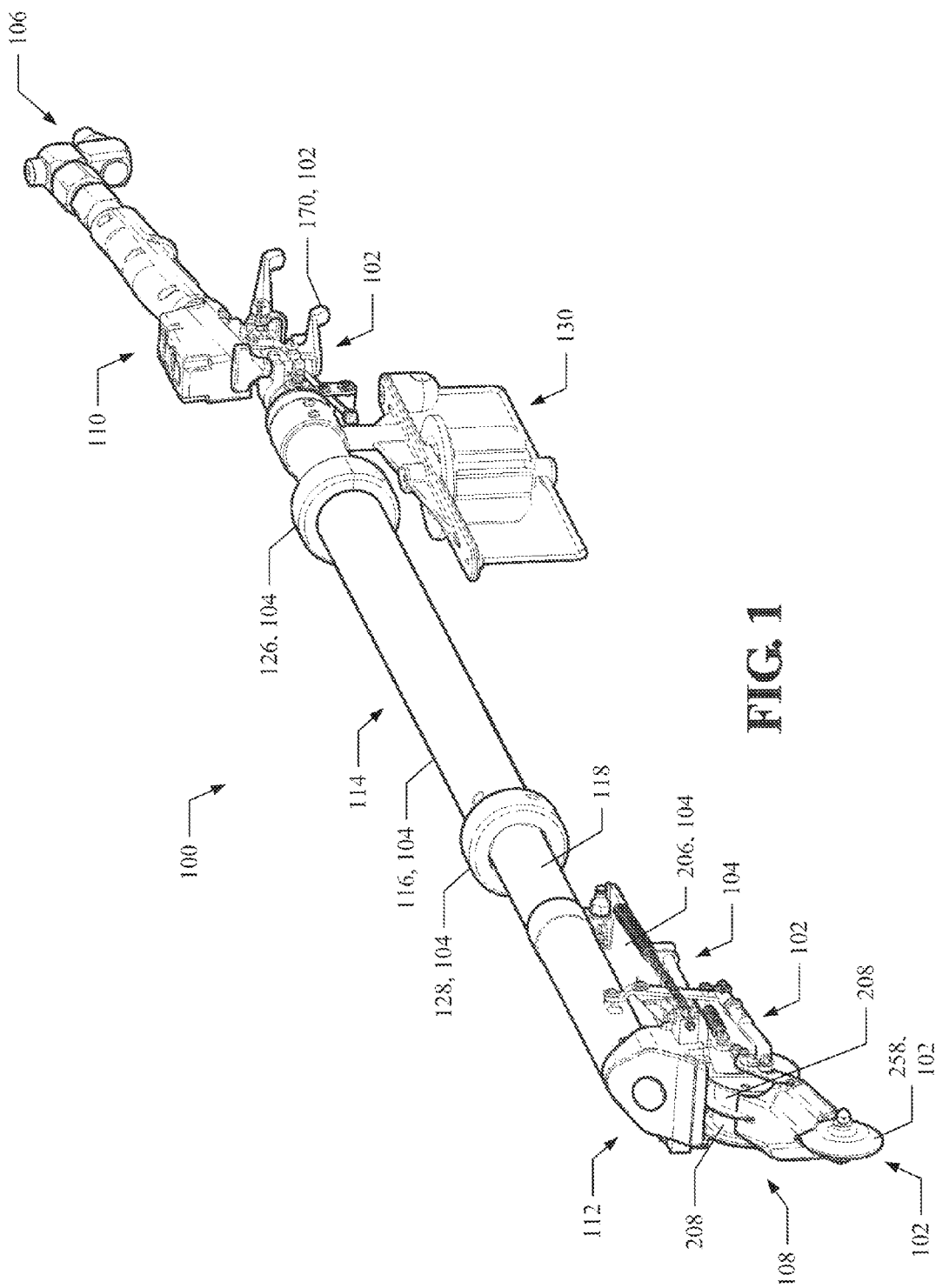
FIG. 1 displays an end perspective view of a taping tool having a creaser wheel/actuator assembly and a tape advance/actuator assembly in accordance with an example embodiment of the present invention.

Referring now to the drawings in which like numerals represent like elements or steps throughout the several views, FIG. 1 displays an end perspective view of a taping tool 100 having a creaser wheel/actuator assembly 102 and a tape advance/actuator assembly 104 in accordance with an example embodiment. The taping tool 100 (sometimes referred to herein as the "taper 100") applies mastic to tape and subsequently applies the tape over a gap, seam or joint between adjacent or abutting wallboard members when used by a user thereof. The creaser wheel/actuator assembly 102 of the taping tool 100 applies, when desired by a user of the taper 100, a force to dispensed tape tending to crease the tape along its longitudinal axis and push the tape into a gap, seam or joint between wallboard members as the tape is continuously dispensed during movement of the taper 100 over the gap, seam or joint and in contact with the wallboard members. The creaser wheel/actuator assembly 102 also enables a user of the taper 100 to continuously control the position of a creaser wheel 258 of the creaser wheel/actuator assembly 102 relative to tape being dispensed by the taper 100 and, hence, the amount of force applied to the tape. Advantageously, the creaser wheel/actuator assembly 102 enables a user to control the application of such force with a single finger and without moving his/her hand from a normal grip position on the taper 100.

The taper's tape advance/actuator assembly 104 enables a user to cause the taper 100 to cut tape then being dispensed by the taper 100 as is necessary at the end of gap, seam or joint between wallboard members and to advance tape through and out of the taper 100 to begin applying tape to the same or another gap, seam or joint between wallboard members. Beneficially, the tape advance/actuator assembly 104 may be easily adjusted and retains its setup during rough handling at a construction site.

The taper 100 has a generally elongate shape with a first end 106 and a second end 108 longitudinally distant therefrom. The taper 100 comprises a valve portion 110 located near the taper's first end 106, a head portion 112 located near the taper's second end 108, and a body portion 114 extending therebetween. The valve portion 110 is typically attached to a first end of a supply hose (not shown) that conveys mastic from a pump connected to a second end of the supply hose as mastic is required by the taper 100. During use, a user generally places one of his/her hands on the valve portion 110 to aid in supporting the taper 100 and to provide inputs to the taper 100 controlling the amount of mastic applied to the tape and the operation of the creaser wheel/actuator assembly 102. The head portion 112 advances tape from the taper 100 and cuts the tape in response to user input, applies mastic to the tape being dispensed by the taper 100, and guides the tape toward a gap, seam or joint between wallboard members to which the tape is being applied.

The body portion 114 of the taper 100 is typically gripped by a user's other hand to aid in supporting the taper 100 and receives user input controlling operation of the tape advance/actuator assembly 104 to cut the tape then being dispensed by the taper 100 and to advance the tape through the head portion 112 into position for subsequent application over a gap, seam or joint between wallboard members. More specifically, the body portion 114 includes a control tube 116, an outer tube 118, a push tube 120 (see FIG. 5), and a mastic tube positioned within the push tube 120. The push tube 120 is somewhat shorter in length than the mastic tube and is slidable relative to the mastic tube along the longitudinal axis thereof. The push tube 120 and mastic tube extend essentially between the valve and head portions 110, 112 of the taper 100. The mastic tube defines a channel therein through which mastic flows from the taper's valve portion 110 to the taper's head portion 112 during use of the taper 100. The control tube 116 is somewhat shorter in length than the outer tube 118, has an inside diameter slightly larger than the outside diameter of the outer tube 118, and is slidably mounted about the outer tube 118 so as to enable a user to grasp and slide the control tube 116 along the tube's longitudinal axis relative to the outer tube 118. The control tube 116 forms part of the tape advance/actuator assembly 104, has a first collar 126 extending thereabout generally nearest the taper's valve portion 110, and a second collar 128 extending thereabout generally nearest the taper's head portion 112.

The body portion's control tube 116 is typically grasped by a user between the first and second collars 126, 128 during the taper's use. The control tube 116 is slid by the user relative to the outer tube 118 and toward the taper's valve portion 110 into a first position with the first collar 126 nearest the valve portion 110 to cause the tape advance/actuator assembly 104 to cut the tape being dispensed by the taper 100. Conversely, the control tube 116 is slid by the user relative to the outer tube 118 and toward the taper's head portion 112 into a second position with the second collar 128 nearest the head portion 112 to cause the tape advance/actuator assembly 104 to advance tape through the head portion 112 and into position for subsequent application to a gap, seam or joint between wallboard members.

The taper 100 further comprises a spool mount assembly 130 for holding a spool of tape to be dispensed by the taper 100 during use. The spool mount assembly 130 is secured to the body portion's outer tube 118 near the taper's valve portion 110. When the taper 100 is in use, tape travels from the spool mount assembly 130, through a tape guide 206 of the tape advance/actuator assembly 104 located in the taper's head portion 112, and exits the taper's head portion 112 over a creaser wheel 258 of the creaser wheel/actuator assembly 102.

Figure 2:
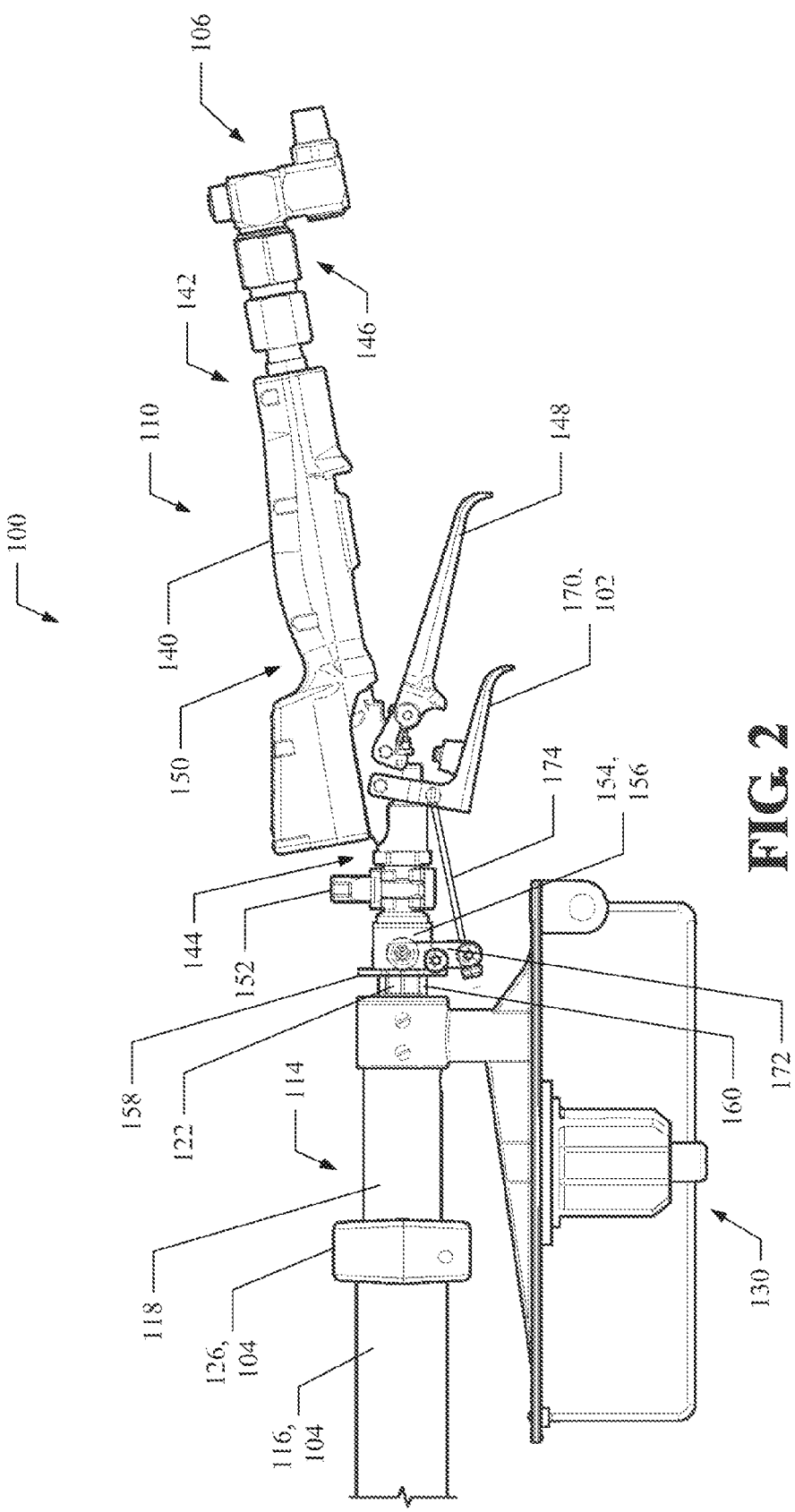
FIG. 2 displays a partial, side elevational view of the taping tool, in accordance with the example embodiment, showing a valve portion, spool mount assembly, and part of a body portion thereof.

FIG. 2 displays a partial, side elevational view of the taper 100, in accordance with the example embodiment, showing the valve portion 110, spool mount assembly 130, and part of the body portion 114 thereof. The valve portion 110 comprises a valve handle 140 having a first end 142 and a second end 144. The valve handle 140 defines an internal channel extending between the first and second ends 142, 144 that allows mastic to flow through the valve handle 140 from the first end 142 toward the second end 144. The valve handle's first end 142 is connected to a fluid coupling 146 that receives and connects to the supply hose conveying mastic from a pump to the taper 100. The fluid coupling 146 is in fluid communication with the valve handle's internal channel such that mastic flows through the fluid coupling 146 and into the first end 142 of the valve handle 140 during use of the taper 100.

The valve portion 110 further comprises a valve actuator 148 hingedly connected thereto for controlling the flow of mastic from a connected pump to the taper 100 and, hence, for controlling the amount of mastic flowing through the body portion's mastic tube to the taper's head portion 112. The valve handle 140 has a grip area 150 adapted to receive the palm of a user's hand with the user's fingers positioned on the valve actuator 148. During use, squeezing of the valve actuator 148 by a user to bring the valve actuator 148 nearest the valve handle 140 causes mastic to flow from the pump via the supply hose, through fluid coupling 146, and through the valve handle 140. Conversely, allowing the valve actuator 148 to move farthest away from the valve handle 140 causes mastic to stop flowing from the pump via the supply hose, through fluid coupling 146, and through the valve handle 140.

The valve portion 110 still further comprises a quick disconnect fitting 152 connected to the second end 144 of the valve handle 140 and a swivel joint 154 fluidically connected to the mastic tube of the taper's body portion 114 between the inner tube and the quick disconnect fitting 152. The swivel joint 154 has a housing 156 and a fitting 122 that is partially received by the housing 156 and extends between the housing 156 and the mastic tube of the taper's body portion 114. The fitting 122 defines an internal fluid communication channel between the housing 156 and the mastic tube for the flow of mastic therethrough. The fitting 122 is held in a stationary relationship with the taper's body portion 114 such the housing 156 is rotatable relative to fitting 122 along a longitudinal axis extending through the housing 156 and fitting 122. The swivel joint 154 also has a coupling 124 that extends from the housing 156 toward the taper's first end 106 and is connected to the quick disconnect fitting 152. The coupling 124 defines an internal passage therein that is in fluid communication with the internal channel of the fitting 122 and with an internal passage of the quick disconnect fitting 152 such that, during use, mastic received from the valve handle's internal channel flows through the quick disconnect fitting 152 and swivel joint 154 (including fitting 122 and coupling 124 thereof) into the body portion's mastic tube. The swivel joint 154 permits components of the taper 100 between the swivel assembly 154 and the taper's first end 106 (including, but not limited to, the taper's valve portion 110) to rotate relative to the components of the taper 100 between the swivel assembly 154 and the taper's second end 108 along a longitudinal axis of the taper 100. The ability to rotate the taper 100 in such manner allows the taper 100 to be utilized by a user to apply tape to gaps, seams or joints between wallboard members in hard to reach locations, thereby improving the taper's utility over earlier taping tools. A push plate 158 having a plurality of push pins 160 extending therefrom is positioned between the swivel joint 154 and the taper's body portion 114. The push pins 160 engage a collar fixedly attached to the outer surface of the body portion's push tube 120 near the end of the mastic tube nearest the valve portion 110.

The creaser wheel/actuator assembly 102 comprises components interacting with the taper's valve portion 110 or head portion 112. As illustrated in FIG. 2, the creaser wheel/actuator assembly 102 includes a creaser wheel actuator 170 that is hingedly connected to the valve handle 140 for use by a user in controlling the position of a creaser wheel 258 relative to the taper's head portion 112 (and to the taper's first and second ends 106, 108) and the amount of force applied by the creaser wheel 258 to tape being dispensed from the taper 100. Normally, when no pressure is applied to the creaser wheel actuator 170, the creaser wheel 258 is biased by biasing member 294 and resides in an initial position fully extended away from the taper's head portion 112 and farthest away from the taper's first end 106. When a user increasingly squeezes the creaser wheel actuator 170 to increasingly overcome the force exerted by the biasing member 294 tending to rotate the creaser wheel 258 away from the taper's first end 106, the creaser wheel 258 correspondingly and increasingly retracts from the initial position toward a fully retracted position nearest the taper's first end 106.

Such operation is unlike other taping tools in which the creaser wheel's initial position is nearer the taper's first end and the creaser wheel is extended increasingly away from the taper's first end as a user actuates the creaser wheel thereof. By virtue of such "reverse" operation of the present taper's creaser wheel/actuator assembly 102, the biasing member 294 always maintains a force tending to rotate the creaser wheel 258 away from the taper's first end 106, thereby maintaining the creaser wheel 258 in contact with dispensed tape and the gap, seam or joint between wallboard members being taped without user intervention and reducing user fatigue. Maintenance of the creaser wheel 258 in such contact causes the taper 100 to normally push the dispensed tape somewhat into the gap, seam or joint between wallboard members and, hence, cause the dispensed tape to become better secured to the wallboard members over the gap, seam or joint. To achieve this beneficial effect with other taping tools, a user must constantly actuate their creaser wheels. In addition, such "reverse" operation of the present taper's creaser wheel/actuator assembly 102 enables a user to rotate, or retract, the creaser wheel 258 toward the taper's first end 106 when starting to dispense tape from the taper 100 over a gap, seam or joint between wallboard members, thereby enabling the user to engage the wallboard members with the taper's main wheels 280 to start the application of dispensed tape to the wallboard members. If the user subsequently moves the taper 100 with the creaser wheel 258 trailing the main wheels 280 as tape is dispensed, operation of the biasing member 294 causes the taper's creaser wheel 258 to engage the dispensed tape and push the tape into the gap, seam or joint being taped.

The creaser wheel/actuator assembly 102, as briefly described above, includes a linkage mechanism 172 rotatably connected to a tab depending from the swivel assembly's housing 156 such that the linkage mechanism 172 rotates relative to the housing 156 about a transverse axis extending through the housing's tab. Because the linkage mechanism 172 is connected to the tab, the linkage mechanism 172 is also rotatable in unison with the swivel joint's housing 156 and with the valve portion 110 of the taper 100 relative to the head and body portions 112,114 of the taper 100. A connecting link 174 of the creaser wheel/actuator assembly 102 is connected to and between the creaser wheel actuator 170 and linkage mechanism 172. During use, a user may apply appropriate force to the creaser wheel actuator 170 using one or more fingers while holding the valve handle 140. When the creaser wheel actuator 170 is rotated toward the valve handle 140, a force is applied to the connecting link 174 causing the linkage mechanism 172 to rotate. Such rotation of the linkage mechanism 172 causes the linkage mechanism 172 (and, more particularly, roller wheels 166 thereof) to engage and translate the push plate 158 and the push tube 120 toward the taper's second end 108. When the user allows the creaser wheel actuator 170 to rotate away from the valve handle 140, force is removed from the connecting link 174 causing the linkage mechanism 172 to again rotate. Such rotation of the linkage mechanism 172 disengages the linkage mechanism 172 (and, more particularly, roller wheels 166 thereof) from the push plate 158, permitting the push plate 158 and push tube 120 to return and translate toward the taper's first end 106 and permitting the creaser wheel 258 to rotate back to its initial position farthest away from the taper's first end 106. By virtue of the linkage mechanism 172 being also rotatable in unison with the swivel joint's housing 156 and in unison with the valve portion 110 of the taper 100 relative to the head and body portions 112, 114 of the taper 100 and by virtue of the roller wheels 166 being rollable on the push plate 158, the creaser wheel 258 may be actuated by the taper's user while the taper's valve portion 110 is being rotated relative to the taper's head and body portions 112, 114 about the taper's longitudinal axis.

Figure 3:
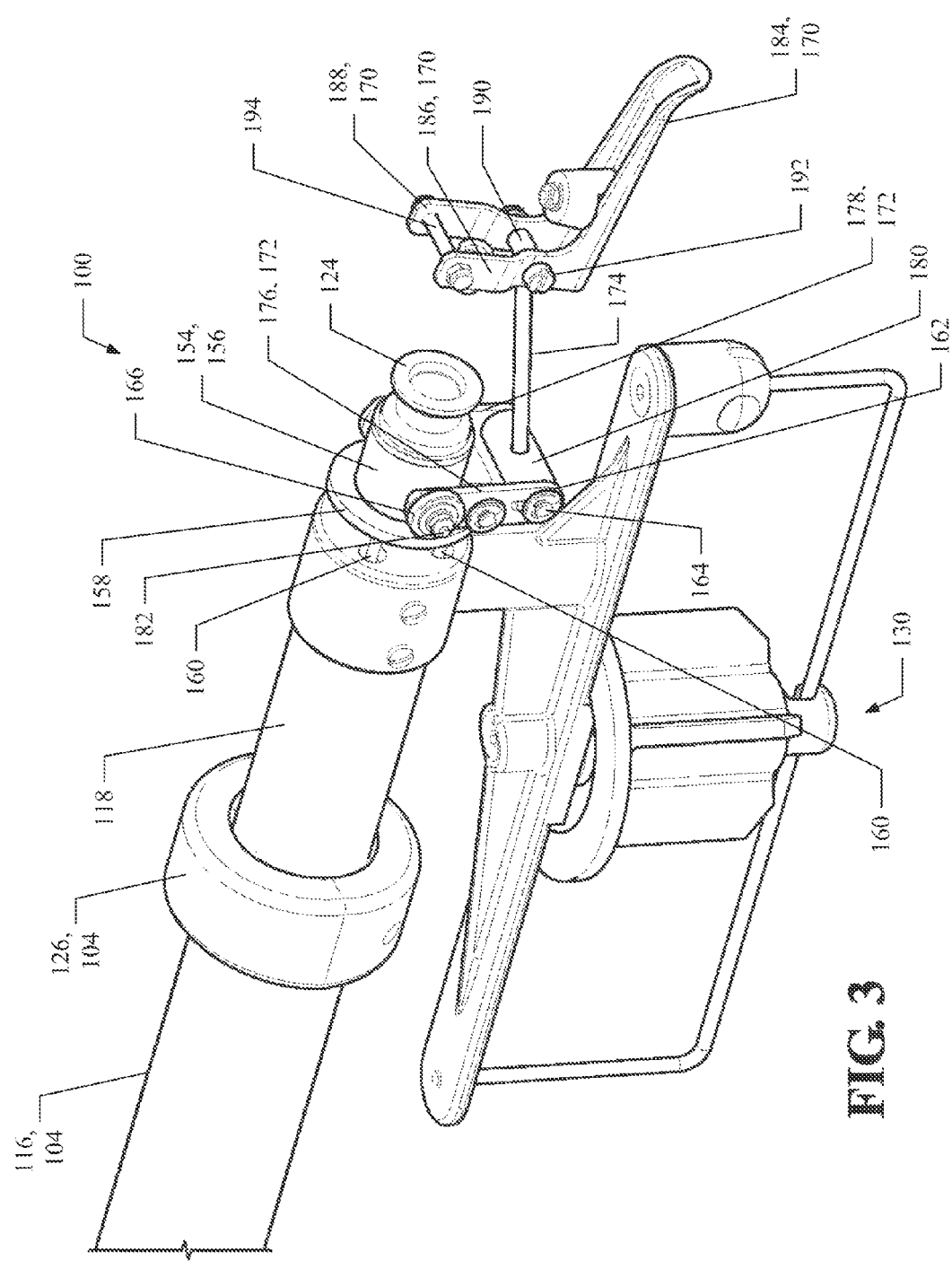
FIG. 3 displays a partial, side perspective view of the taping tool, in accordance with the example embodiment, in which various components of the valve portion are not shown in order to render components of the creaser wheel/actuator assembly more visible.

FIG. 3 displays a partial, side perspective view of the taper 100, in accordance with the example embodiment, in which various components of the valve portion 110 are not shown in order to render components of the creaser wheel/actuator assembly 102 more visible. As seen in FIG. 3, the linkage mechanism 172 includes first and second arms 176, 178 that are substantially parallel to one another and coupled together by rod 180 extending therebetween. The first and second arms 176, 178 are pivotally connected to rod 180 by respective E-rings 162 and fasteners 164. Respective roller wheels 166 are connected to the first and second arms 176, 178 by fasteners 182 so that the roller wheels 166 engage the push plate 158 and push the push plate 158 toward the taper's second end 108 when the first and second arms 176, 178 are pivoted relative to rod 180 by a user squeezing the creaser wheel actuator 170. Alternatively, roller wheels 166 disengage the push plate 158 and allow the push plate 158 to return toward the taper's first end 106 when a user releases the creaser wheel actuator 170. As noted above, by virtue of the operation of the linkage mechanism 172 and roller wheels 166, a user may swivel the valve handle 140 about the taper's longitudinal axis while retracting the creaser wheel 258, thereby enhancing the usability of the taper 100.

The creaser wheel actuator 170 has a grip portion 184 with first and second legs 186, 188 extending therefrom. The first and second legs 186, 188 are substantially parallel and receive a rod 190 extending therebetween secured to the legs 186, 188 by fasteners 192. Connecting link 174 extends between rod 180 of the linkage mechanism 172 and rod 190 of the creaser wheel actuator 170. A pin 194 extends through opposed holes defined, respectively, by legs 186, 188 and through valve handle 140 to pivotally attach the creaser wheel actuator 170 to the valve handle 140.

Figure 4:
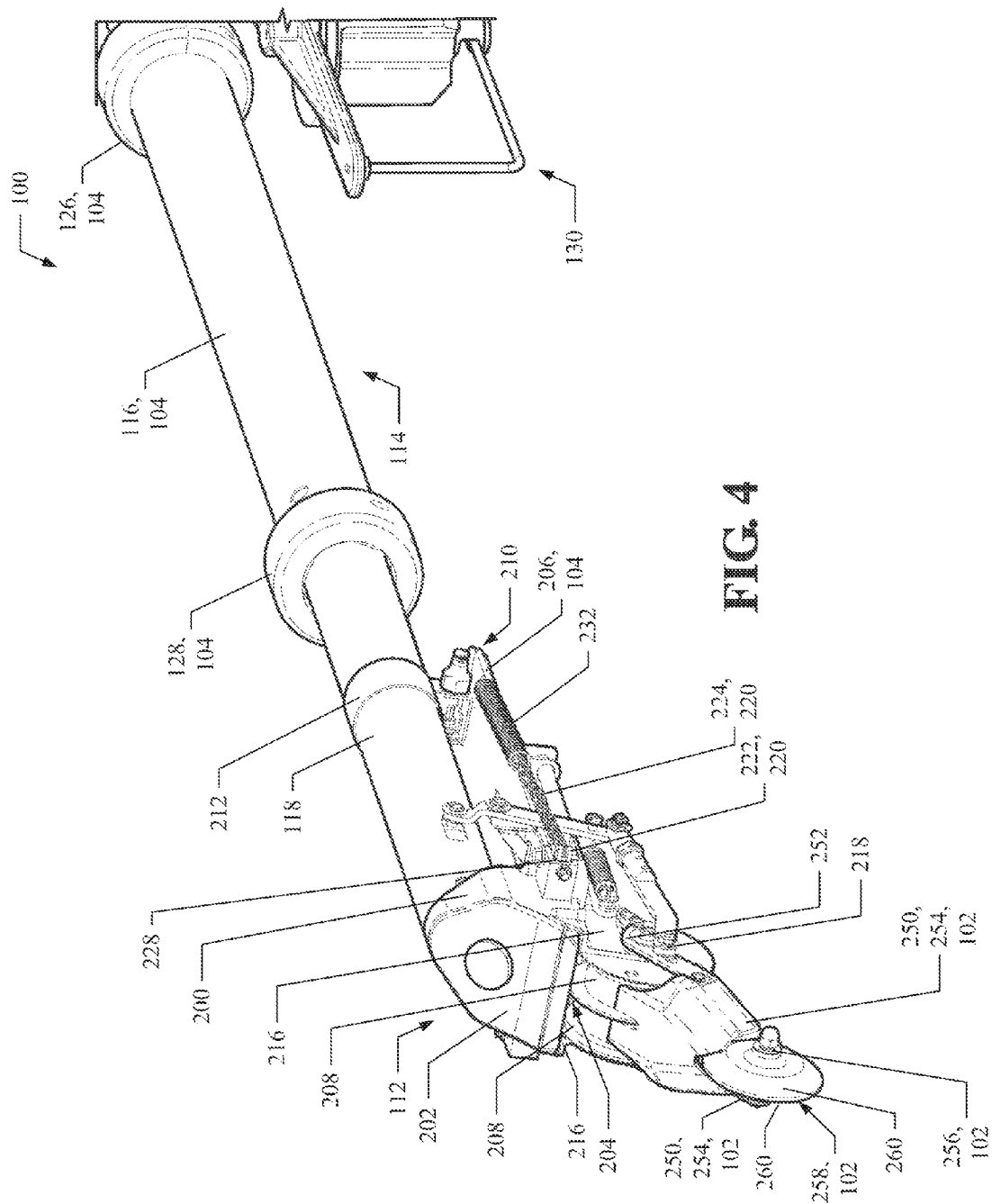
FIG. 4 displays a partial, side perspective view of the taping tool, in accordance with the example embodiment, showing a head portion and part of a body portion thereof.

FIG. 4 displays a partial, side perspective view of the taper 100, in accordance with the example embodiment, showing the head portion 112 and part of the body portion 114 thereof. The head portion 112 comprises a head body 200 that is coupled to and receives the body portion's outer tube 118 and mastic tube extending therein conveying mastic into the head body 200 during use. A head cover 202 is attached to the head body 200 and defines an opening 204 therebetween such that mastic delivered to the head body 200 exits the head body 200 through the opening 204.

The head portion 112 further comprises a tape guide 206 of the tape advance/actuator assembly 104 and a pair of main wheels 208. A first end 210 of the tape guide 206 is suspended from outer tube 218 via a collar 212 that is secured to and extends at least partially around the outer tube 218. A second end 214 of the tape guide 206 extends beneath and is attached to the head body 200. The tape guide 206 has a pair of flanges 216 depending therefrom. An axle 218 extends between the flanges 216 and receives the main wheels 208 for rotation about the axle 218 between the flanges 216. During use, tape received from the spool mount assembly 130 enters the tape guide's first end 210, travels atop the tape guide 206 beneath outer tube 118, and exits the tape guide 206 at the second end 214 thereof. As the tape exits the tape guide 206, the tape passes under the head body 200 and over main wheels 208 with mastic dispensed through opening 204 being applied to the tape.

In addition to the tape guide 206 forming part of the taper's head portion 112, the tape advance/actuator assembly 104 also includes a cutter sub-assembly 220 for cutting tape passing beneath the head body 200 in response to a user sliding control tube 116 relative to outer tube 118 and toward the first end 106 of the taper 100. The cutter sub-assembly 220 has a cutter block 222 extending within the head body 200 which holds a cutter blade (not visible) for cutting the tape. The cutter sub-assembly 220 also has first and second chains 224, 226 attached to the cutter block 222 and extending from the head body 200 through respective openings 228, 230 therein. The first chain 224 is coupled to tape guide 206 via a biasing member 232. According to the example embodiment, the biasing member 232 comprises an extension spring, but the biasing member 232 may comprise other similarly capable components and/or devices in other example embodiments. The second chain 226 is visible in FIG. 6 described below.

Similar to the tape advance/actuator assembly 104, the creaser wheel/actuator assembly 102 includes various components forming part of the head portion 112 of the taper 100. More specifically, the creaser wheel/actuator assembly 102 comprises creaser wheel mounting arms 250 having first ends 252 that are pivotally mounted to axle 218 adjacent flanges 216. The creaser wheel mounting arms 250 have second ends 254 distant from first ends 252 that receive an axle 256 extending therethrough and coupling the arms 250 for movement together relative to flanges 216 and main wheels 208. The creaser wheel/actuator assembly 102 further comprises a creaser wheel 258 mounted for rotation about axle 256 and between creaser wheel mounting arms 250. The creaser wheel 258 has sloped portions 260 adapted for creasing tape as it exits the taper 100 and adapted for receipt by a gap, seam or joint between wallboard members. According to the example embodiment, sloped portions 260 define an angle of approximately ninety degrees (90°) therebetween. Such angle tends to prevent the tape from being excessively creased and folded more than ninety degrees (90°) as the tape is pressed into wet mastic.

Figure 5:
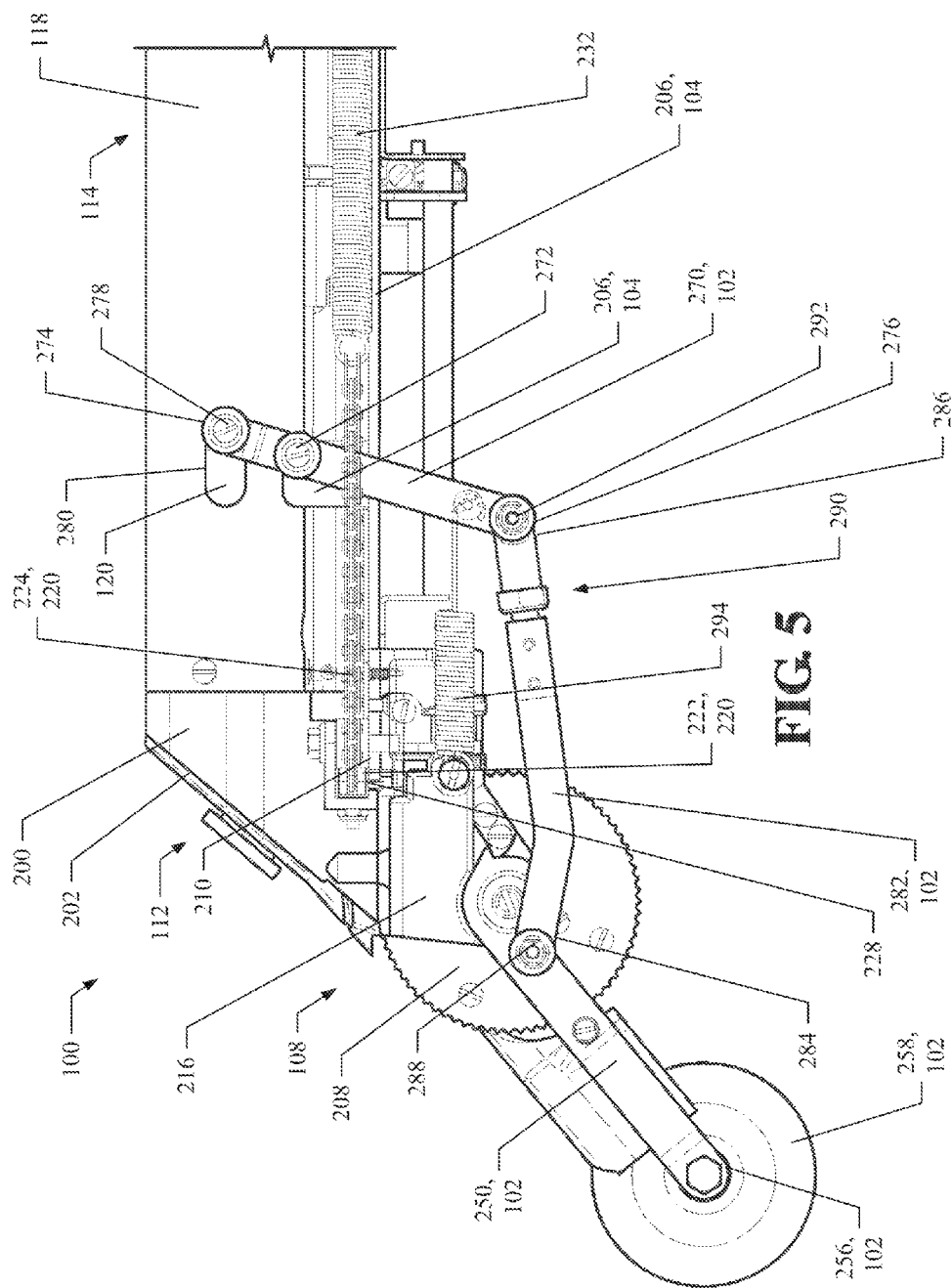
FIG. 5 displays a partial, side elevational view of the taping tool, in accordance with the example embodiment, showing the head portion and part of the body portion thereof.

FIG. 5 displays a partial, side elevational view of the taper 100, in accordance with the example embodiment, showing the head portion 112 and part of the body portion 114 thereof. As seen in FIG. 5, the creaser wheel/actuator assembly 102 further includes a first linkage member 270 that is pivotally connected to tape guide 206 by a fastener 272 such that the first linkage member 270 is rotatable about fastener 272. The first linkage member 270 has a first end 274 and a second end 276 distant therefrom. The first linkage member's first end 274 is secured to a collar (not visible) that extends around and is attached to the push tube 120 within outer tube 118. A fastener 278 extends through a corresponding hole in the first linkage member 270 and through a slot 280 defined in outer tube 118 to so secure the first linkage member 270 to the collar.

The creaser wheel/actuator assembly 102 still further includes a second linkage member 282 having a first end 284 and a second end 286 distant therefrom. The first end 284 of the second linkage member 282 is pivotally connected to a creaser wheel mounting arm 250 by a fastener 288, enabling the second linkage member 282 to pivot relative to the creaser wheel mounting arm 250 and enabling the second linkage member 282 to transfer forces to the creaser wheel mounting arm 250 either pushing or pulling the creaser wheel 258 nearer or farther away from the taper's first and second ends 106, 108, as the case may be. An adjustable coupling 290 is attached to the second end 286 of the second linkage member 282. The adjustable coupling 290 is pivotally attached via a fastener 292 to the second end 276 of the first linkage member 270 so that the second linkage member 282 may pivot relative to the first linkage member 270. During use, when the push tube 120 translates within the outer tube 118 in response to a user squeezing or releasing the creaser wheel actuator 170, the first linkage member 270 rotates about fastener 272 causing a force to be exerted on and transferred to the second linkage member 282 tending to push or pull, as the case may be, the creaser wheel 258 nearer or farther away from the taper's first or second ends 106, 108. Through adjustment of adjustable coupling 290 to increase or decrease the distance between fastener 288 and fastener 292 (and, effectively, increase or decrease the length of the second linkage member 282), the distance that the creaser wheel 258 (and, hence, the distance that the creaser wheel 258 is moved relative to the taper's first and second ends 106, 108) is moved in response to movement of the creaser wheel actuator 170 may be increase or decreased.

Additionally, the creaser wheel/actuator assembly 102 includes a biasing member 294 that maintains the creaser wheel 258 in its initial fully-extended position relative to the taper's second end 108 when a user is not squeezing the creaser wheel actuator 170. When a user squeezes the creaser wheel actuator 170 to retract the creaser wheel 258 (i.e., to bring the creaser wheel 258 nearer the taper's first end 106), the biasing force created by the biasing member 294 tending to return the creaser wheel 258 to its initial fully-extended position must be overcome by the user. It should be appreciated that the biasing force created by the biasing member 294 causes creasing of the tape subject to the biasing force being overcome, in whole or in part, by a user squeezing the creaser wheel actuator 170.

Figure 6:
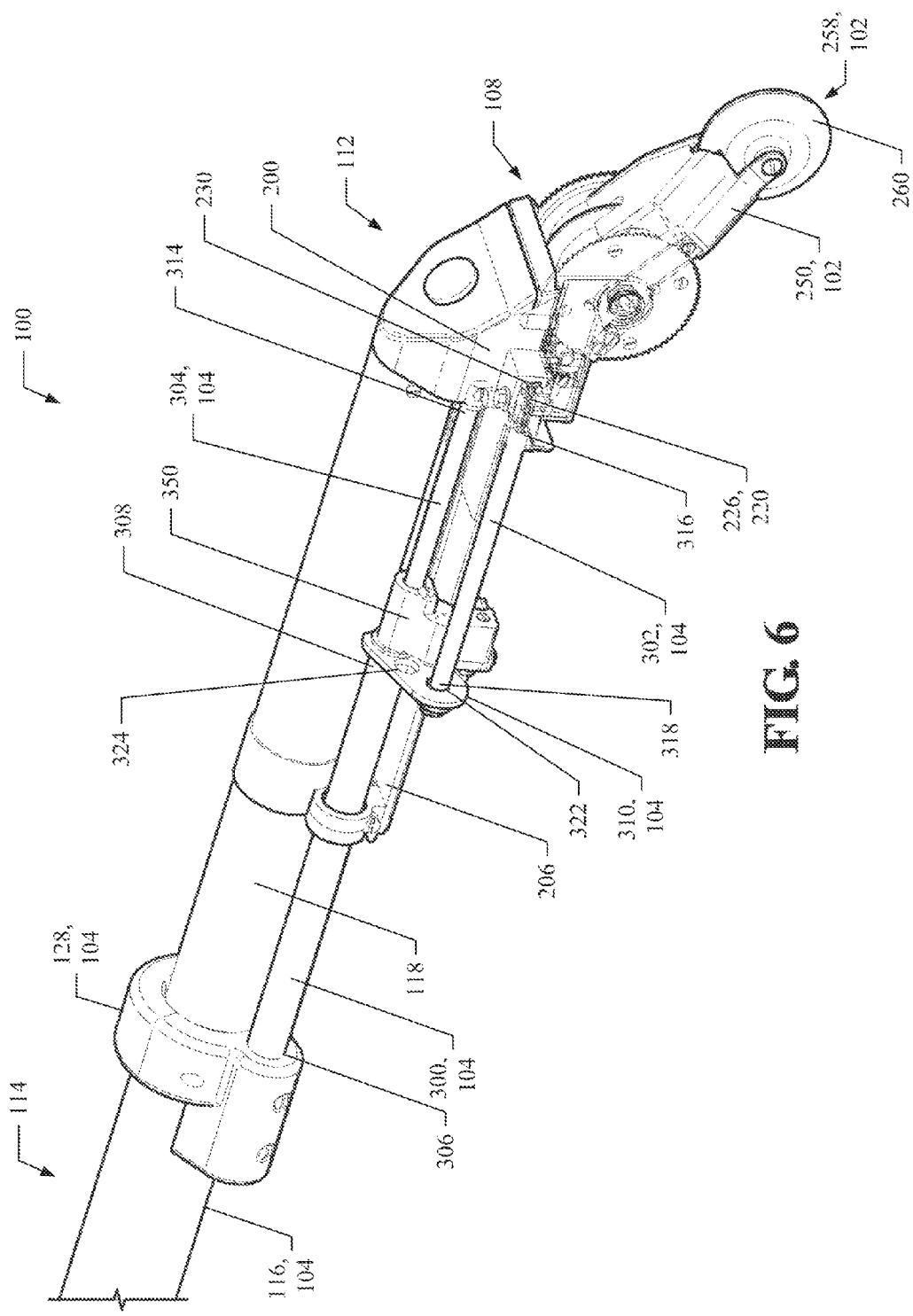
FIG. 6 displays a partial, end perspective view of the taping tool, in accordance with the example embodiment, showing the head portion and part of the body portion thereof.

FIG. 6 displays a partial, end perspective view of the taper 100, in accordance with the example embodiment, showing the head portion 112 and part of the body portion 114 thereof. As illustrated in FIG. 6, the tape advance/actuator assembly 104 additionally includes a control arm 300 generally comprising an elongate sleeve, a cutter link tube 302, and a guide rod 304. The control arm 300 has a first end 306 fixedly attached to the control tube's second collar 128 so that the control arm 300 moves with the control tube 116 when the control tube 116 is moved in a longitudinal direction relative to the taper's first and second ends 106, 108. The control arm 300 also has a second end 308 distant from the first end 306 and at which a control arm plate 310 is fixedly attached around and extending laterally from the control arm 300. The guide rod 304 comprises an elongate member having a first end (not visible) and a second end 314 distant therefrom fixedly attached to the head body 200. The guide rod's first end is slidably located within the control arm 300 so that the control arm 300 slides over and relative to the guide rod 304 when the control tube 116 is slidably moved relative to the body portion's outer tube 118.

The cutter link tube 302 has a generally elongate shape with a first end 316 and a second end 318 distant therefrom. The cutter link tube's first end 316 is connected to the cutter sub-assembly's second chain 226. The cutter link tube 302 has a collar 320 (see FIG. 7) extending around and attached to the cutter link tube 302 at the second end 318 thereof. The control arm plate 310 defines an opening 322 therein through which the cutter link tube 302 extends with the cutter link tube's collar 320 and second end 318 located to the side of the plate 310 nearest the taper's first end 106. The control arm plate 310 also has a magnetic tab 324 that interacts with a magnet 358 (see FIG. 8) of a tape advance mechanism 350 of the tape advance/actuator assembly 104 as described below. During use, when a user pulls the control tube 116 toward the taper's first end 106 to cause cutting of the tape, the control arm 300 also moves toward the taper's first end 106 with the control arm plate 310 engaging the cutter link tube's collar 320 and pulling the cutter link tube 302 toward the taper's first end 106 as well. The cutter link tube 302, in turn, pulls on the cutter sub-assembly's second chain 226, causing the cutter block 222 to travel transversely across the tape passing beneath the head body 200 with the cutter blade cutting the drywall tape.

The tape advance/actuator assembly 104, as seen in FIG. 6, further includes a tape advance mechanism 350 (described in more detail below) that receives guide rod 304 therethrough such that the tape advance mechanism 350 is partially supported by and slides relative to guide rod 304. When a user desires to advance tape through the taper 100, the user slides the control tube 116 toward the taper's second end 108, causing the control arm 300 and control arm plate 310 to slide toward the taper's second end 108 with the control arm plate 310 engaging the tape advance mechanism 350. Once engaged by the control arm plate 310, the tape advance mechanism 350 moves with the control arm 300 and control arm plate 310 toward the taper's second end 108, thereby feeding and advancing tape through the tape guide 206 and beneath the head body 200.

Figure 7:
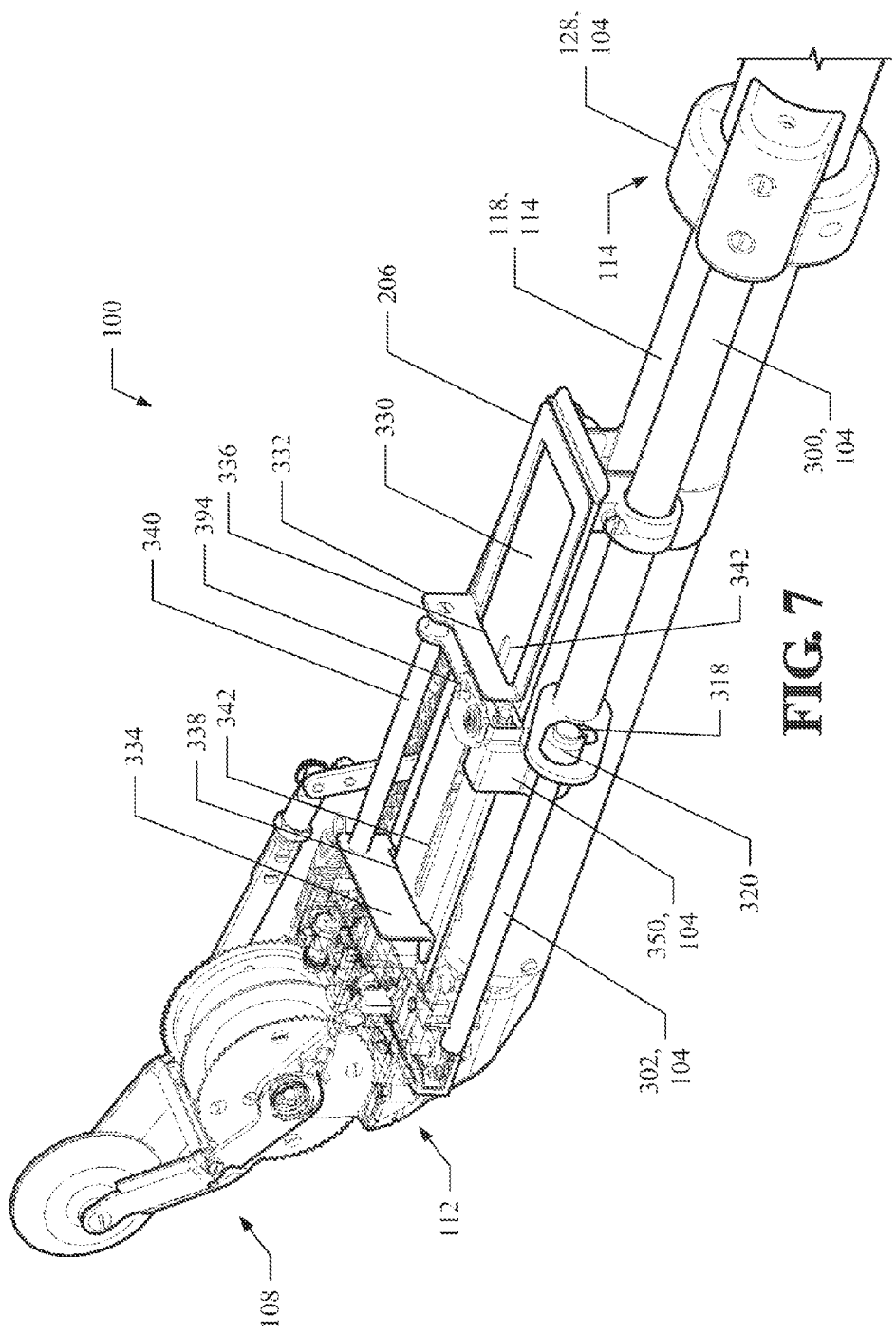
FIG. 7 displays a partial, bottom perspective view of the taping tool, in accordance with the example embodiment, showing the head portion and part of the body portion thereof.

FIG. 7 displays a partial, bottom perspective view of the taper 100, in accordance with the example embodiment, showing the head portion 112 and part of the body portion 114 thereof. In FIG. 7, the tape guide 206 of the tape advance/actuator assembly 104 is more readily seen extending generally adjacent to outer tube 118. The tape guide 206 has a substantially planar bed 330, a first stop 332, and a second stop 334. The first and second stops 332, 334 extend perpendicularly relative to the bed 330 with the first stop 332 being nearer the taper's first end 106 and the second stop 334 being nearer the taper's second end 108. The first and second stops 332, 334 form respective openings 336, 338 with the bed 330 such that, during the taper's use, tape slides against the bed 330 and through openings 336, 338. A guide rod 340 extends between the first and second stops 332, 334. The bed 330 defines a slot 342 extending therethrough and substantially between the first and second stops 332, 334. The slot 342 is positioned and sized so as to receive a tape engagement member 380 (also sometimes referred to herein as "needle 380") of the tape advance mechanism 350 of the tape advance/actuator assembly 104 when tape is being advanced relative to the tape guide 206 by the user moving the control tube 116 toward the taper's second end 108.

Figure 8:
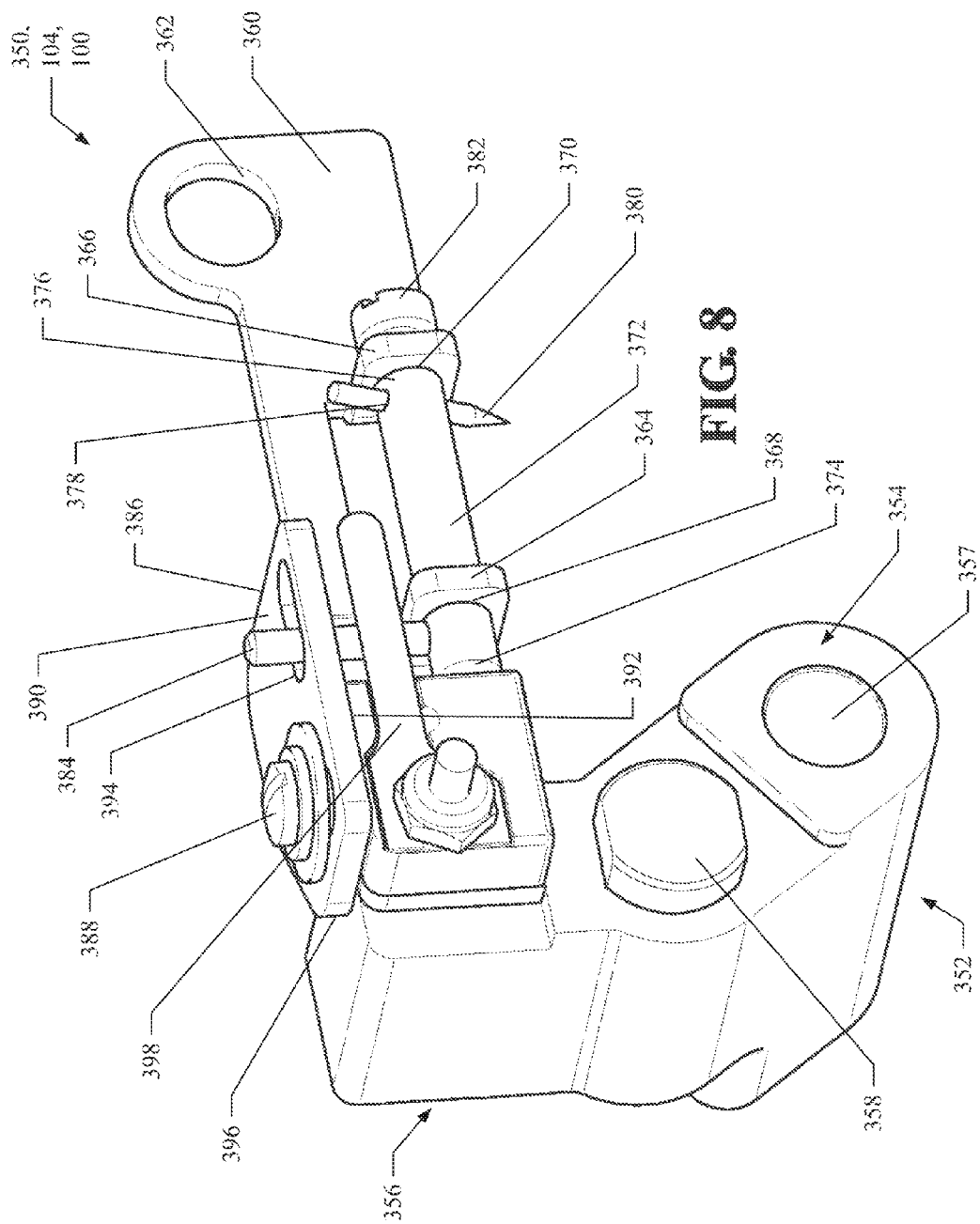
FIG. 8 displays an end perspective view of a tape advance mechanism of the tape advance/actuator assembly of the taping tool in accordance with the example embodiment.

FIG. 8 displays an end perspective view of a tape advance mechanism 350 of the tape advance/actuator assembly 104 of the taper 100 in accordance with the example embodiment. The tape advance mechanism 350 comprises a body portion 352 having a first end 354 and a second end 356 opposed thereto. The body portion 352 defines a bore 357 extending between the body portion's first and second ends 354, 356 for slidably receiving guide rod 304 therethrough such that the body portion 352 (and, hence, the tape advance mechanism 350) is partially supported by and slidably mounted relative to guide rod 304. The body portion 352 also has a magnet 358 mounted therein that is attracted to the magnetic tab 324 of the control arm plate 310 of the control arm 300. The magnet 358 attracts and maintains the body portion 352 of tape advance mechanism 350 substantially in contact with the magnetic tab 324 of the control arm plate 310 so that when the control arm 300 and control arm plate 310 are moved, the tape advance mechanism 350 moves in unison with the control arm 300 and control arm plate 310. Therefore, when a user slides the control tube 116 toward the taper's first end 106 to cause cutting of the tape passing through the taper 100, the tape advance mechanism 350 is also moved toward the taper's first end 106, thereby positioning the tape advance mechanism 350 for subsequent advancing of the tape by the user's sliding of the control tube 116 toward the taper's second end 108.

The tape advance mechanism 350 further comprises a support arm 360 extending laterally from the mechanism's body portion 352. The support arm 360 defines a hole 362 therethrough for slidably receiving guide rod 340 that partially supports the tape advance mechanism 350. As the tape advance mechanism 350 is moved during use relative to a longitudinal axis of the tape guide's bed 330 between first and second stops 332, 334, the support arm 360 rides on and slides relative to guide rod 340.

The support arm 360 has first and second tabs 364, 366 extending from the same side of the support arm 360 with the first tab 364 being located nearest the mechanism's body portion 352. The first and second tabs 364, 366 define respective bores 368, 370 extending therethrough for receiving a needle holding rod 372 that is rotatable about the rod's longitudinal axis within the bores 368, 370. The needle holding rod 372 has a first end 374 nearest the mechanism's body portion 352 and a second end 376 nearest the support arm's second tab 366. The needle holding rod 372 defines a bore 378 extending laterally therethrough that receives a needle 380 therein. The needle holding rod 372 further defines a threaded bore (not visible) extending internal within and between the rod's second end 376 and bore 378. The threaded bore receives a threaded fastener 382 that engages the needle 380 and holds the needle 380 in position. The length of the portion of the needle 380 extending from the needle holding rod 372 toward the tape guide's bed 330 may be adjusted by loosening threaded fastener 382, sliding the needle 380 within bore 378 to increase or decrease the length of the needle portion extending from the needle holding rod 372, and re-tightening the threaded fastener 382 in contact with the needle 380. The needle holding rod 372 also has an actuator rod 384 extending from the needle holding rod 372 between the support arm's first tab 364 and the mechanism's body portion 352.

The tape advance mechanism 350 still further comprises an actuator plate 386 that is rotatably secured to the mechanism's body portion 352 by a fastener 388 such that the actuator plate 386 is rotatable about a longitudinal axis extending through the fastener's ends. The actuator plate 386 has opposed planar, first and second faces 390, 392 and defines a slot 394 extending therethrough between the first and second faces 390, 392. The slot 394 receives a portion of the actuator rod 384 extending therethrough and is sized, shaped, and oriented so that during operation of the tape advance mechanism 350, the actuator rod 384 is engaged by the actuator plate 386 causing the needle holding rod 372 to rotate about its longitudinal axis and position the needle 380 out of contact with drywall tape sliding through the tape guide 206. The actuator plate 386 also has an edge 396 between the plate's first and second faces 390, 392 that comes into contact with the tape guide's second stop 334 during operation and causes the actuator plate 386 to rotate about the longitudinal axis extending through the ends of fastener 388. A biasing member 398 is fixedly attached to the mechanism's body portion 352 and extends therefrom and in contact with actuator rod 384. When the actuator rod 384 is not engaged by the actuator plate 386, the biasing member 398 operates to rotate the actuator rod 384 and, hence, the needle holding rod 372 so that the needle 380 is in contact with and engages tape being advanced through the tape guide 206. According to the example embodiment, the biasing member 398 comprises a leaf spring, but may comprise other elements or forms in other example embodiments.

A user utilizes the tape advance/actuator assembly 104 during use of the taper 100 to cut off tape being dispensed by the taper 100 and to advance tape out of the taper's second end 108 for application to a gap, seam or joint between wallboard members. As described above, the user slides the control tube 116 of the tape advance/actuator assembly 104 fully toward the taper's first end 106 to cause cutting of the tape. When the control tube 116 is moved toward such position, the tape advance mechanism 350 is pulled along and slid relative to guide rods 304, 340 by sliding of the control arm 300 (and corresponding movement of the control arm plate 310) and the magnetic attraction between the tape advance mechanism's magnet 358 and control arm plate's magnetic tab 324 coupling the tape advance mechanism 350 and control arm plate 310. At the time cutting of the tape occurs, the tape advance mechanism 350 is positioned against the tape guide's first stop 332 with the biasing member 398 causing rotation of actuator and needle holding rods 384, 372 so that the mechanism's needle 380 is in contact and engagement with the tape nearest the first stop 332.

Figure 9:
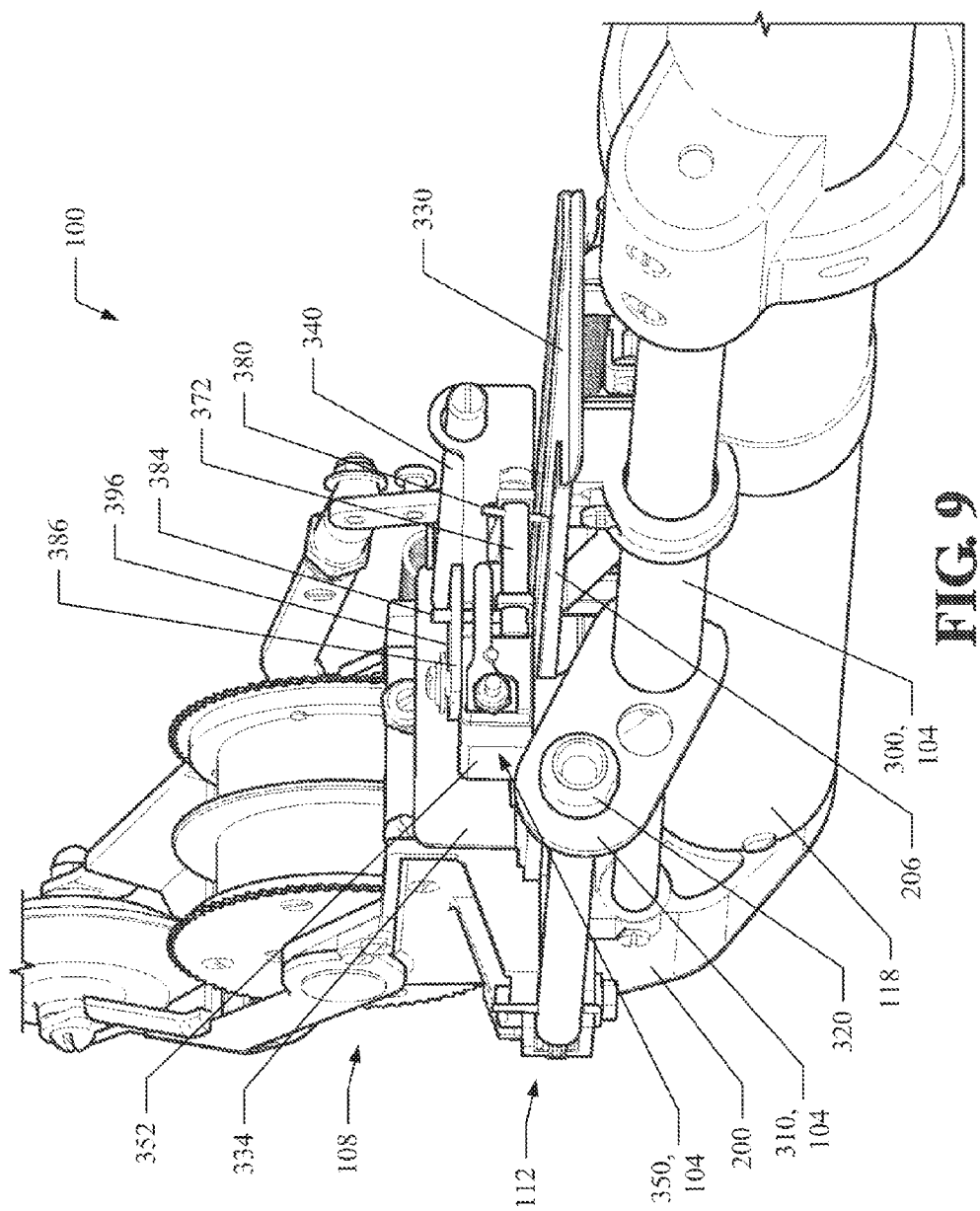
FIG. 9 displays a partial, side perspective view of the taping tool, in accordance with the example embodiment, showing a tape advance mechanism of the tape advance/actuator assembly thereof.

As the user moves the control tube 116 toward the taper's second end 108 after cutting of the tape in order to advance tape through and from the taper 100, the control arm 300 and control arm plate 310 also move toward the taper's second end 108 in contact with the body portion 352 of the tape advance mechanism 350. Being pushed by the control arm plate 310, the tape advance mechanism 350 slides along guide rods 304, 340 toward the tape guide's second stop 334 with the needle 380 protruding through the tape and the tape guide's slot 342 to pull the tape along the tape guide's bed 330 through the tape guide 206 and out of the taper 100. When the tape advance mechanism 350 is moved sufficiently toward the taper's second end 108 to engage the tape guide's second stop 334 as seen in FIG. 9, the mechanism's actuator plate 386 is rotated due to contact between the plate's edge 396 and the tape guide's second stop 334 causing subsequent rotation of the actuator and needle holding rods 384, 372. Rotation of the actuator and needle holding rods 384, 372 causes the needle 380 to rotate into a position in which the needle 380 is no longer in contact or engagement with the tape. In such position, tape freely moves through the tape guide 206 adjacent to the tape guide's bed 330, under the head body 200 receiving mastic, and out of the taper 100 at the taper's second end 108.

Figure 10:
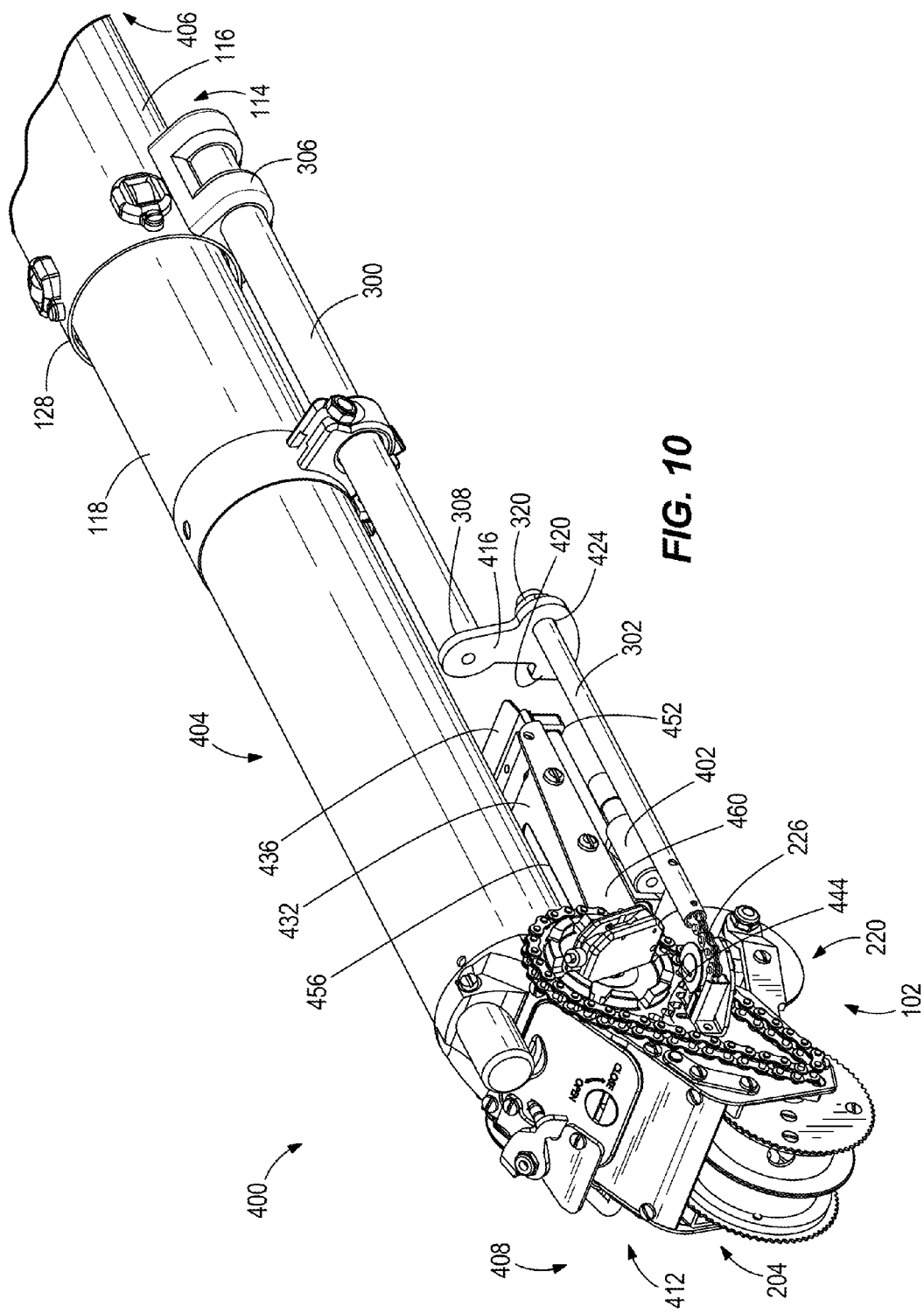
FIG. 10 displays a partial, top perspective view of the taping tool including a tape advance/actuator assembly according to a second embodiment.
Figure 11:
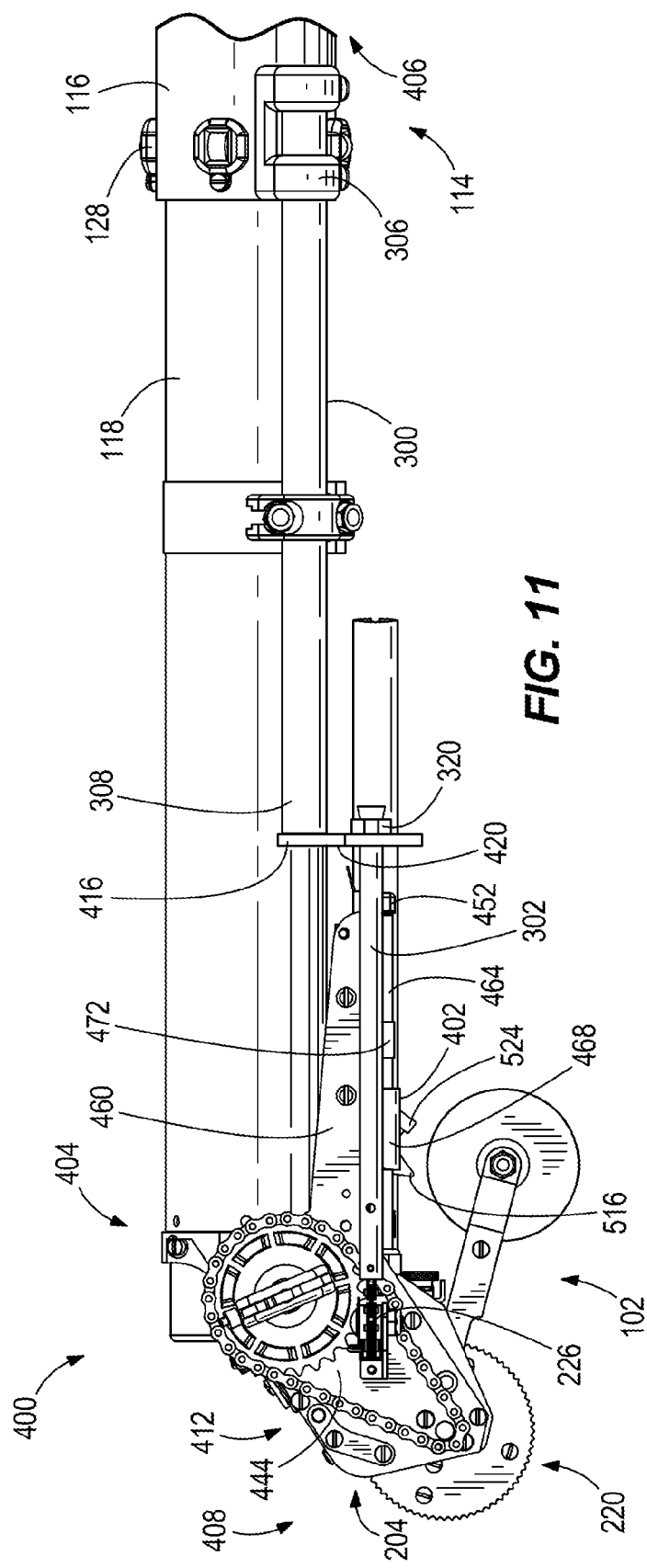
FIG. 11 displays a partial, side view of the taping tool of FIG. 10.

FIGS. 10-16 illustrate a second embodiment of a tape advance mechanism 402 for the taper 400. The second embodiment of the tape advance mechanism 402 shares some features with the first embodiment of the tape advance mechanism 350, and, therefore, only notable differences will be discussed in detail below. Specifically, only the second end 408 of the second embodiment of the taper 400 is substantially different from the first embodiment of the taper 100. Like the first embodiment of the tape advance mechanism 350, the second embodiment of the tape advance mechanism 402 is also advanced by movement of a tape advance/actuator assembly 404, as explained in greater detail below. As illustrated in FIG. 10, the second embodiment of the taper 400 also includes a head portion 412 that advances tape from the taper 400 and cuts the tape in response to user input (e.g., sliding the control tube 116), applies mastic to the tape being dispensed, and guides the tape.

Figure 13:
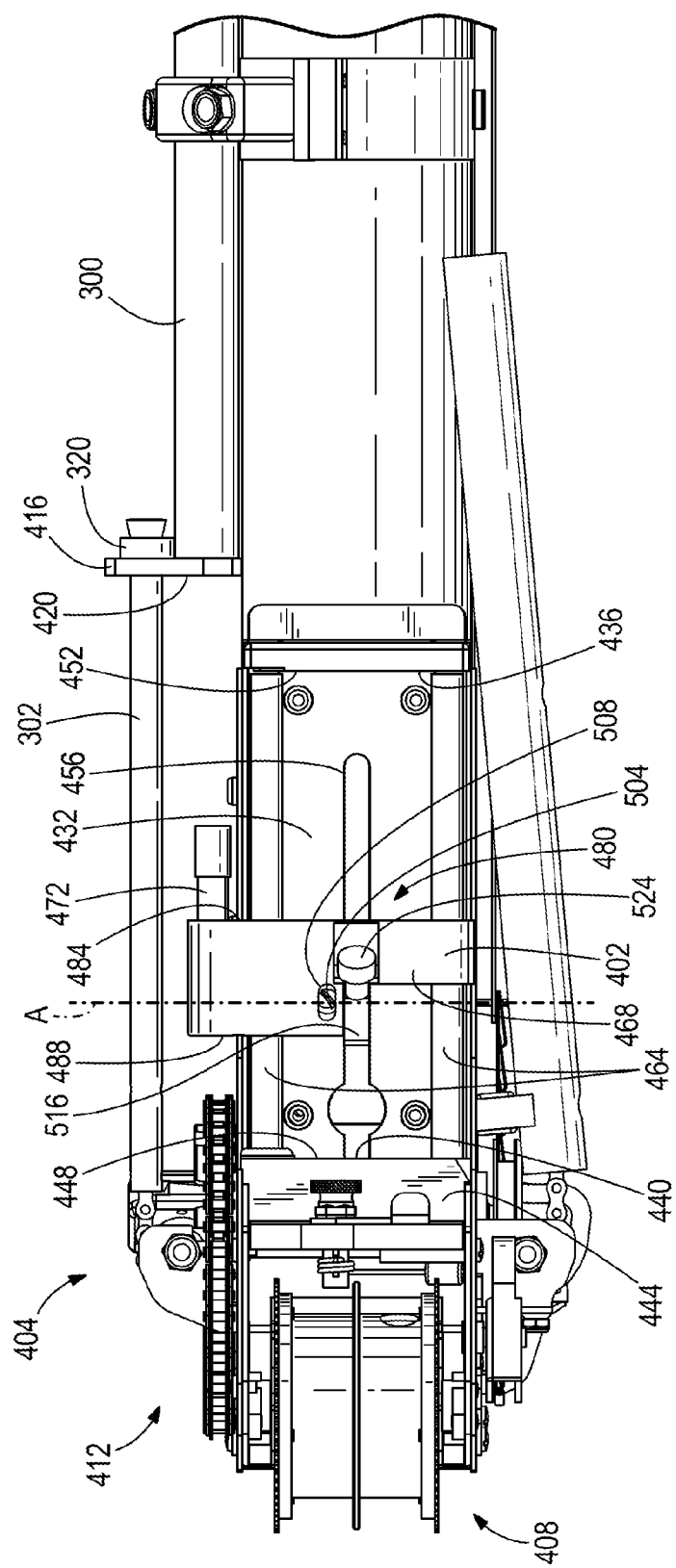
FIG. 13 displays a partial, bottom view of the taping tool of FIG. 10 without the creaser wheel assembly.

The tape advance/actuator assembly 404 also includes a cutter sub-assembly 220 the same as the first embodiment. The first end 306 of the control arm 300 is fixedly coupled to the second collar 128 of the control tube 116 so that the control arm 300 moves with the control tube 116. A control arm plate 416 is also fixedly attached to the second end 308 of the control arm 300. The control arm plate 416 includes a magnetic tab 420 and an opening 424 for the cutter link tube 302, as illustrated in FIGS. 10 and 13. The opening 424 of the control arm plate 416 allows the control arm plate 416 to slide along the cutter link tube 302 when the control tube 116 is moved. The control arm plate 416 abuts the collar 320 positioned at the second end 318 of the cutter link tube 302 when the control tube 116 is moved far enough toward the first end 406 of the taper 400. Similar to the first embodiment, when the control tube 116 is moved far enough toward the first end 406 of the taper 400, the control arm plate 416 pulls on the chain 226, through the collar 320 and the cutter link tube 302, to cut the tape.

Figure 12:
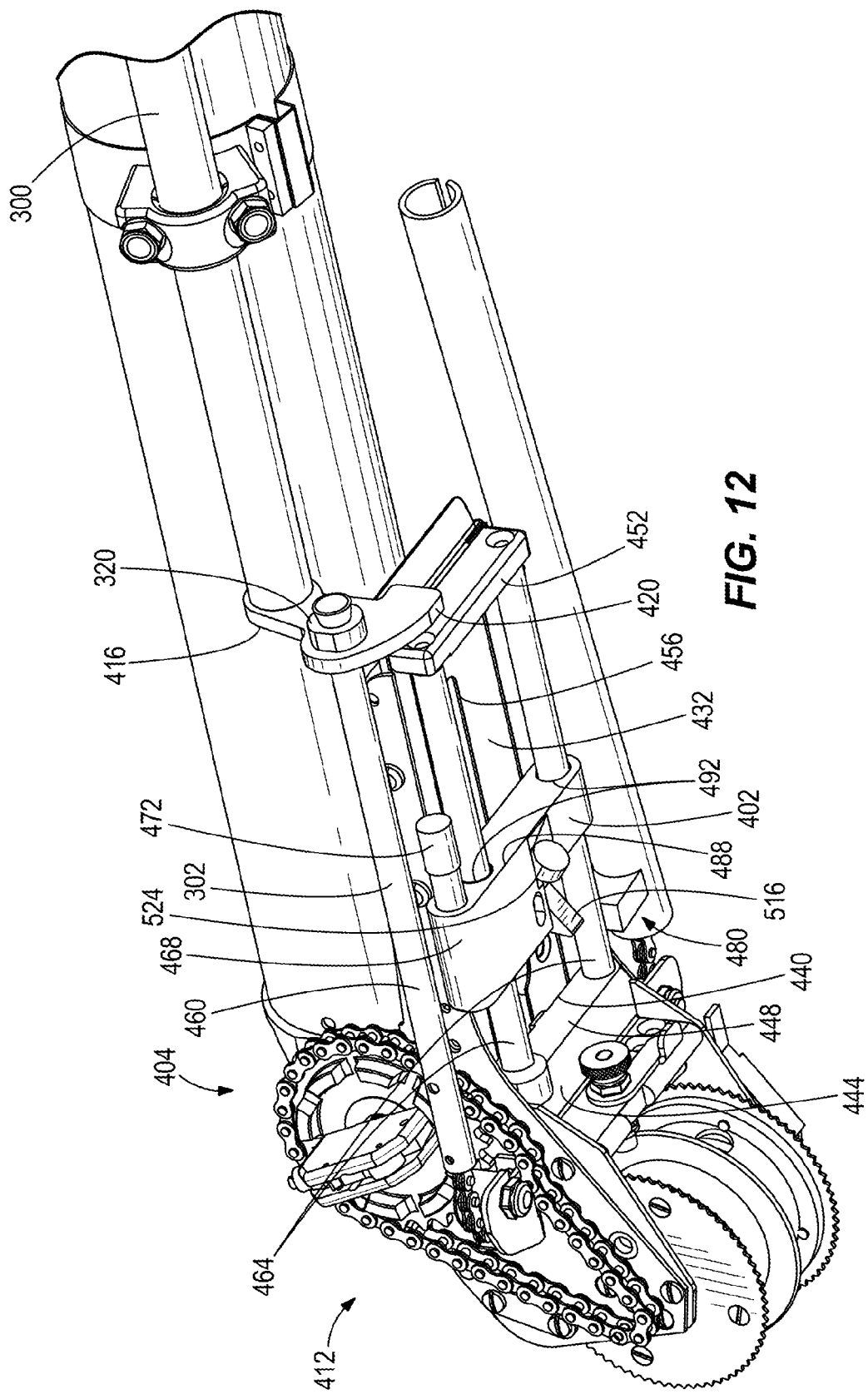
FIG. 12 displays a partial, bottom perspective view of the taping tool of FIG. 10 without the creaser wheel assembly.

When the taper 400 is in use, tape travels from the spool mounted assembly 130, through a tape guide 432 located in the head portion 412, and exits the head portion 412. A first end 436 of the tape guide 432 is free-floating and adjacent the outer tube 118. In another embodiment, the first end 432 of the tape guide 432 may be secured to the outer tube 118 via a collar (not illustrated), like that of the tape guide 206. A second end 440 of the tape guide 432 extends beneath and is attached to a head body 444 of the head portion 412. As illustrated in FIG. 12, the second end 440 of the tape guide 432 is attached to a first stop 448 of the head body 444. A rod block 452 is positioned at the second end 440 of the tape guide 432 such that the rod block 452 provides a second stop, as explained in greater detail below. The tape guide 432 includes a slot 456 extending therethrough and substantially between the first and second stops 448, 452. Like that of the first embodiment, the slot 456 is positioned and sized so as to receive a tape engagement member 528, or needle, of the tape advance mechanism 402.

The head portion 412 includes two flanges 460 that extend from the head body 444 on opposite sides of the tape guide 432, and extend toward the first end 106 of the taper 400 along the length of the tape guide 432 in order to provide support for the tape guide 432. The head portion 412 further includes two guide rods 464 that extend parallel to one another from the first stop 448 to the second stop 452. The two guide rods 464 are positioned beneath (in relation to FIG. 11) and at opposite sides of the tape guide 432. In the illustrated embodiment of FIG. 11, the two guide rods 464 extend parallel to the outer tube 118. In other embodiments, the two guide rods 464 may extend nonparallel to the outer tube 118.

Figure 14A:
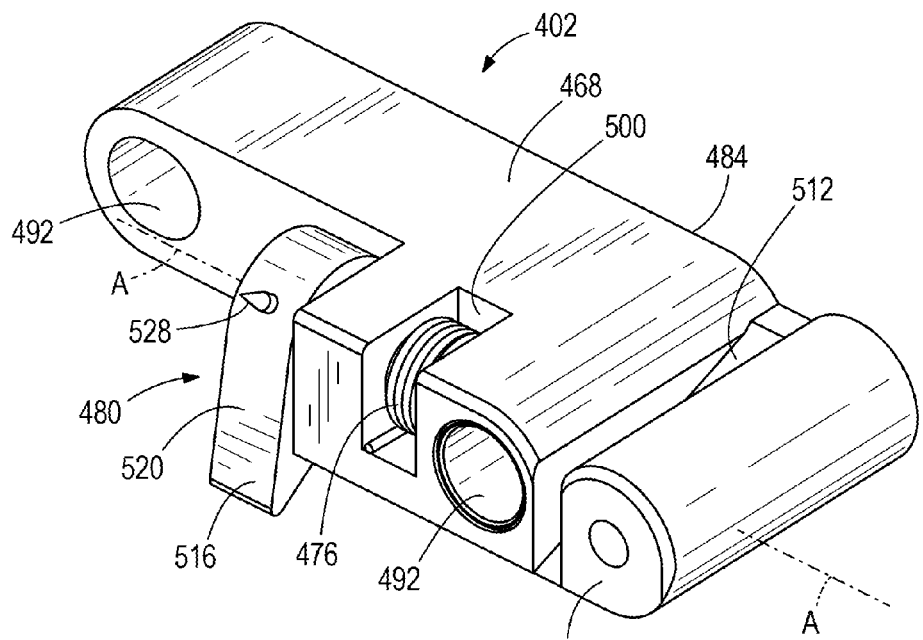
FIGS. 14A and 14B display a perspective view of a tape advance mechanism of the taping tool of FIG. 10.
Figure 14B:
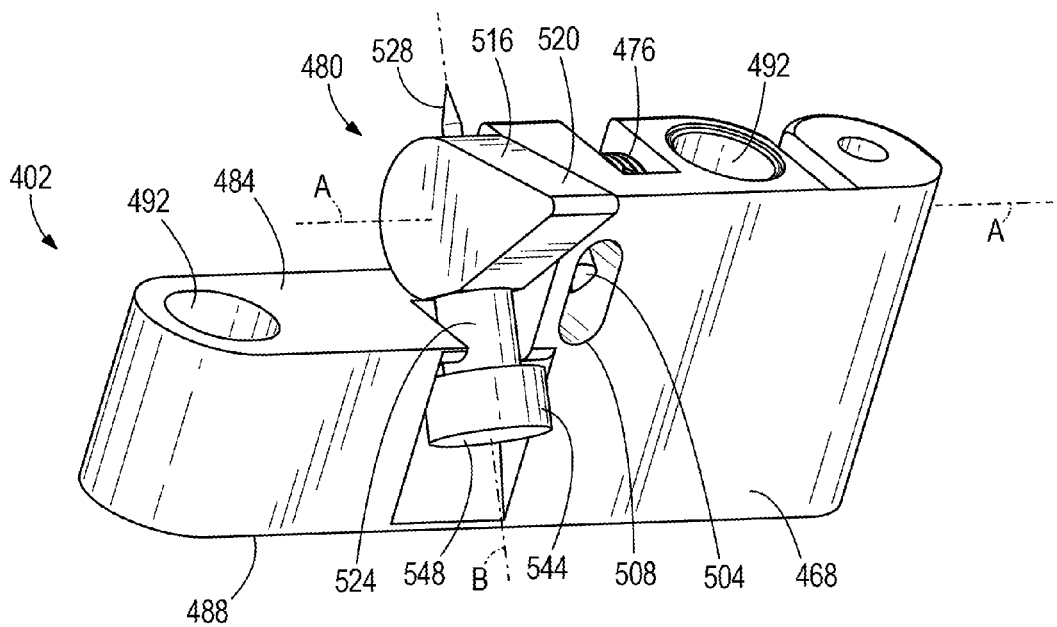
Figure 15:
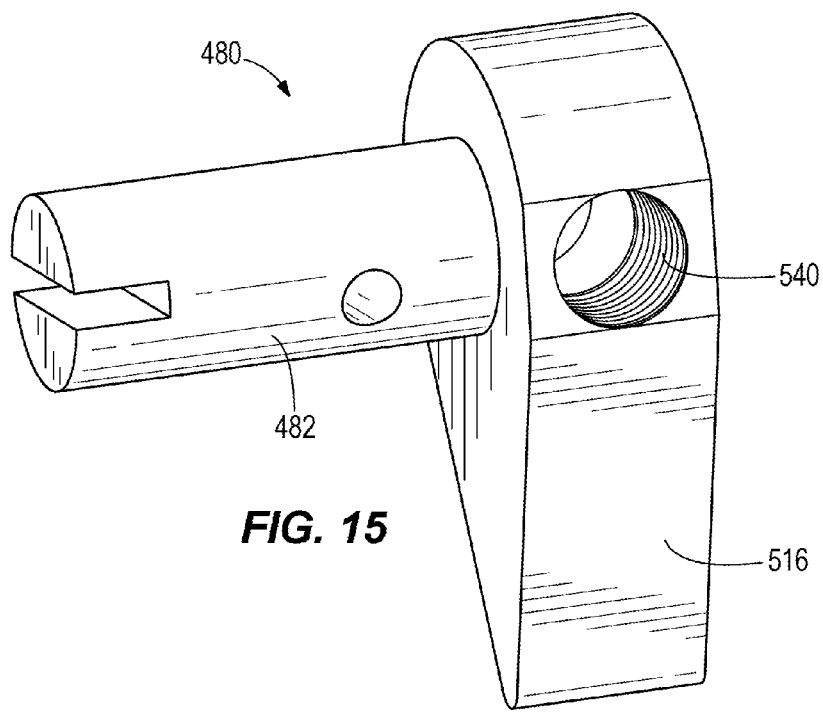
FIG. 15 displays a perspective view of a cam and an axle of the tape advance mechanism of the taping tool of FIG. 10.

The tape advance mechanism 402 includes a body 468, a magnet 472 configured to engage the magnetic tab 420 of the control arm plate 416, a torsion spring 476, and a needle holder assembly 480. The body 468 includes a first face 484, a second face 488, and two parallel channels 492 extending through the body 468 from the first face 484 to the second face 488. When assembled, the two guide rods 464 extend through the two parallel channels 492 so that the tape advance mechanism 402 slides along the two guide rods 464 when coupled to the control arm plate 416, as explained in greater detail below. The magnet 472 is coupled to and extends from the first face 484 of the body 468 via a first opening (not illustrated) in the body 468. The magnet 472 may be coupled to the body 468 of the tape advance mechanism 402 in any functional way (e.g., frictionally coupled, threadably coupled, or attached via an adhesive). In other embodiments, the magnet 472 may be formed similar to the first embodiment of the tape advancement mechanism 350 or the body 472 may be partly or entirely composed of a magnetic material. As illustrated in FIG. 15, the needle holder assembly 480 includes an axle 482 that extends into the body 468 so that the needle holder assembly 480 is rotatably coupled to the body 468 about a rotational axis A (FIG. 14A). The torsion spring 476 is inserted in a first cut-out 500 of the body 468 as illustrated in FIG. 14A. The axle 482 extends through the torsion spring 476 so that the needle holder assembly 480 is coupled to the torsion spring 476 and is rotatably urged about the rotational axis A by the torsion spring 476, as explained in greater detail below. As illustrated in FIG. 14B, a fastener 504 extends into the axle 482 of the needle holder assembly 480 from a second opening 508 of the body 468 to prevent the needle holder assembly 480 from sliding out of the body 468. The fastener 504 may also prevent the needle holder assembly 480 from rotating too far in either direction about the rotational axis A. The body 468 also includes a second cut-out 512 so that the body 468 does not contact one of the flanges 460 of the head portion 412 when the tape advance mechanism 402 is moved toward the second end 108 of the taper 400.

As illustrated in FIGS. 14A, 14B, 15, and 16, the needle holder assembly 480 further includes a cam 516 having a cam surface 520, a needle holder 524, and a needle 528 secured to a first end 532 of the needle holder 524. The cam 516 is coupled to the axle 482 and may be formed with the axle 482 such that the cam 516 and the axle 482 are one-piece. The needle 528 is positioned in an opening 552 of the needle holder 524, as described in greater detail below. As illustrated in FIGS. 14A and 14B, the cam 516 and the needle 528 each rotate about the rotational axis A.

Figure 16:
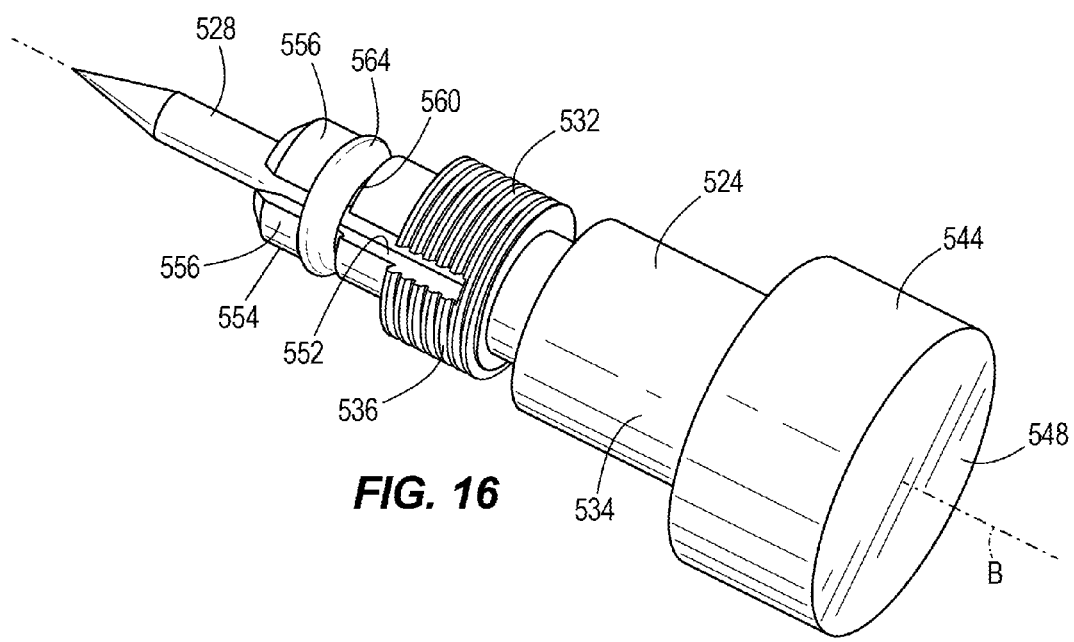
FIG. 16 displays a perspective view of a needle holder and a needle of the tape advance mechanism of the taping tool of FIG. 10.

As illustrated in FIG. 16, the needle holder 524 includes a body 534, threads 536 for threadably coupling to a threaded opening 540 of the cam 516, a grip 544, and a tip portion 554 positioned at the first end 532 of the needle holder 524. The tip portions 554 includes two spaced cantilevers 556 that are separated by two axial cut-outs (one axial cut-out is shown in FIG. 16) and that are fixed at one end to the body 534. The two spaced cantilevers 556 define an annular groove 560 for receiving an O-ring 564. The opening 552 is also positioned in the tip portion 554 between the two spaced cantilevers 556. The two spaced cantilevers 556 may flex to widen the opening 552, allowing the needle 524 to be more easily inserted therein and removed therefrom. The two spaced cantilevers 556 securely hold the needle 524 in the opening 552 with help from the O-ring 564 positioned in the annular groove 560. A longitudinal axis B of the needle holder 524 is coaxial with a longitudinal axis B of the needle 528 when the needle 528 is positioned in the needle holder 524. The grip 544 is positioned at a second end 548 of the needle holder 524. In the illustrated embodiment of FIG. 16, the grip 544 is a cylindrical knob. In other embodiments, the grip 544 may be a spherical knob, among other things.

In the embodiment illustrated in FIGS. 15 and 16, the needle holder 524 is threadably and frictionally secured to the cam 516 by the threads 536 and the O-ring 564, respectively. The O-ring 564 provides a frictional fit between the needle holder 524 and the cam 516 so the needle holder 524 is more firmly secured in the cam 516. When the needle holder 524 is fully secured within the cam 516 (e.g., fully rotated into the cam 516), the needle 528 extends a fixed, set distance out of the cam 516. This allows an operator to quickly and easily switch out a damaged needle 528, as necessary, by unscrewing the needle holder 524 via the grip 544 from the cam 516, and replacing the needle 528 in the needle holder 524 by opening the two spaced cantilevers 556 of the tip portion 554. The set projection distance of the needle 528 through the cam 516 allows the operator to quickly install the needle 528 without having to worry about correctly setting the projection distance, unlike the first embodiment, as described above in which the projection distance is variable. In other embodiments, the needle holder 524 may be secured within the cam 516 in other ways (e.g., only frictionally, only threadably, or with an adhesive).

In operation, an operator may utilize the tape advance/actuator assembly 404 during use of the taper 400 to cut off tape being dispensed by the taper 400 and to advance tape out of the second end 408 of the taper 400 for application to a gap, seam, or joint between wallboard members. When starting with the tape advance mechanism 402 positioned against the first stop 448, the cam 516 is rotated against the first stop 448 so that the needle 528 is rotated out of the slot 456 and away from engagement with the tape. Furthermore, when the tape advance mechanism 402 is positioned against the first stop 448, the magnet 472 is engaged with the magnetic tab 420 and the control arm plate 416 is positioned away from the collar 320. As the tape advance mechanism 402 is drawn along the two guide rods 464 toward the first end 406 of the taper 400 by the connection between the magnet 472 and the magnetic tab 420, the cam 516 and axle are urged by the torsion spring 476 such that when the tape advance mechanism 402 has been moved far enough from the first stop 448, the needle 528 rotates, but does not break through the tape. The needle 528 is drawn along with the tape advance mechanism 402. In the illustrated embodiment, the torsion spring 476 is not too strong, so the needle 528 does not drag the tape toward the first end 406 of the taper 400 when the needle 528 is being moved. When the second face 488 of the body 468 of the tape advance mechanism 402 abuts the second stop 452, the connection between the magnet 472 and the magnetic tab 420 is broken such that the tape advance mechanism 402 remains positioned against the second stop 452 while the control arm plate 416 continues moving. The operator slides the control tube 116 of the tape advance/actuator assembly 404 fully toward the first end 406 of the taper 400 so that the control arm plate pulls 416 on the chain 226 to cut the tape, as described in greater detail above.

To begin reapplying tape the operator simply slides the control tube 116 back toward the second end 408 of the taper 400. Because the needle 528 is angled toward the second end 408 of the taper 400, the needle 528 breaks through the tape once the needle 528 begins moving along the tape toward the second end 408 of the taper. As the control tube 116 moves toward the second end 408, the magnet 472 will reengage the magnet tab 420 and the control arm plate 416 will push the tape advance mechanism 402 toward the first stop 448. The needle 528 remains engaged with the tape and pulls the tape toward the second end 408 of the taper 400. When the cam 516 reaches the first stop 448, the cam surface 520 will follow the first stop 448 as the control arm plate 416 continues toward the second end 108, and the cam 516 will rotate about the rotational axis A until the needle 528 has disengaged the tape, allowing the tape to more freely move through the tape guide 432 and out of the taper 400. As stated above, even if the needle 528 rotates back into the slot 456, the needle 528 will not break through the tape until it is moved in the direction toward the second end 408 of the taper. Therefore, the operator does not need to keep the cam 516 and needle 528 rotated to keep tape flowing out of the taper 400. In some embodiments, the movement of the tape out of the taper 400 will rotate the needle 528 out of the slot 456, if it is not already rotated out of the slot 456 by the cam 516.

It should be appreciated that while the taper 100, 400 of the example embodiments have been described as being connected to a pump providing a user-controlled continuous flow of mastic thereto during use, the creaser wheel/actuator assembly 102 and tape advance/actuator assembly 104, 404 of the taper 100, 400 may be utilized with and incorporated into other tapers that do not receive a continuous flow of mastic. Also, it should be appreciated that while the taper 100, 400 of the example embodiments have been described in connection with finishing wallboard, the taper 100, 400 may be utilized in connection with finishing building materials other than wallboard.

Whereas the present invention is described in detail with respect to the example embodiment, it should be understood that variations and modifications may be effected within the spirit and scope of the present invention, as described herein before and as defined in the appended claims.

What is claimed is:

1. A taping apparatus comprising:
an elongate body portion including a moveable control member for controlling the advancement of tape; and
a head portion connected to the elongate body portion for advancing the tape, the head portion including a first stop, a second stop, a guide extending from the first stop to the second stop, and a tape advance mechanism moveable along the guide,
wherein the tape advance mechanism and the control member are coupled to one another such that the tape advance mechanism is moveable in response to movement of the control member, and
wherein the tape advance mechanism includes a rotatable cam and a needle that rotates with the cam.

2. The taping apparatus according to claim 1, wherein the tape advance mechanism is moveable between the first stop and the second stop.

3. The taping apparatus according to claim 1, wherein the guide includes a first guide rod and a second guide rod extending parallel to each other from the first stop to the second stop, wherein the body of the tape advance mechanism includes two parallel channels, and wherein the first guide rod and the second guide rod are positioned within the two parallel channels so that the body is moveable along the first and the second guide rods from the first stop to the second stop.

4. The taping apparatus according to claim 1, wherein the cam includes a cam surface for engaging the first stop, wherein the needle engages the tape when the cam is at a first position and the needle disengages the tape when the cam is at a second position, and wherein the cam surface engages the first stop at the second position and the cam surface does not engage the first stop at the first position.

5. The taping apparatus according to claim 1, wherein the tape advance mechanism further includes a body and a needle holder, wherein the cam is rotatably coupled to the body, wherein the needle is secured to the needle holder, and wherein the needle holder is secured to the cam.

6. The taping apparatus according to claim 5, wherein the needle holder is threadably secured to the cam.

7. The taping apparatus according to claim 6, wherein the needle projects a fixed, set distance through the cam when the needle holder is fully inserted into the cam.

8. The taping apparatus according to claim 5, wherein the tape advance mechanism further includes a magnet coupleable to the moveable control member, and a torsion spring.

9. The taping apparatus according to claim 8, wherein the needle engages the tape when the cam is at a first position and the needle disengages the tape when the cam is at a second position, wherein the cam surface engages the first stop at the second position and the cam surface does not engage the first stop at the first position, and wherein the torsion spring urges the needle toward the first position.

10. A taping apparatus comprising:
an elongate body portion including a moveable control member for controlling the advancement of tape; and
a head portion connected to the elongate body portion for advancing the tape, the head portion including a guide and a tape advance mechanism moveable along the guide,
wherein the tape advance mechanism and the control member are coupled to one another such that the tape advance mechanism is moveable in response to movement of the control member,
wherein the tape advance mechanism includes a rotatable cam, a needle holder secured to the cam, and a needle secured to the needle holder such that the needle rotates with the cam.

11. The taping apparatus according to claim 10, wherein the needle holder is threadably secured to the cam.

12. The taping apparatus according to claim 11, wherein the needle projects a fixed, set distance through the cam when the needle holder is fully inserted into the cam.

13. The taping apparatus according to claim 10, wherein the cam and the needle rotate about parallel axes.

14. The taping apparatus according to claim 10, wherein the cam and the needle rotate about the same axis.

15. The taping apparatus according to claim 10, wherein the needle holder includes a longitudinal axis, wherein the needle includes a longitudinal axis, and wherein the longitudinal axis of the needle is coaxial with the longitudinal axis of the needle holder.

16. The taping apparatus according to claim 10, wherein the tape advance mechanism further includes a body, a magnet coupleable to the control member, and a torsion spring, and wherein the cam is rotatably coupled to the body.

17. The taping apparatus according to claim 16, wherein the needle engages the tape when the cam is at a first position and the needle disengages the tape when the cam is at a second position, wherein the cam surface engages the first stop at the second position and the cam surface does not engage the first stop at the first position, and wherein the torsion spring urges the needle toward the first position.

18. The taping apparatus according to claim 16, wherein the cam includes an axle, and wherein the axle extends into the body.

19. The taping apparatus according to claim 10, wherein the head portion further includes a first stop and a second stop, wherein the guide extends from the first stop to the second stop, and wherein the tape advance mechanism is moveable along the guide between the first stop and the second stop.

20. A taping apparatus comprising:
    an elongate body portion including a moveable control member for controlling the advancement of tape; and
    a head portion connected to the elongate body portion for advancing tape, the head portion including a first stop, a second stop, a guide extending from the first stop to the second stop, and a tape advance mechanism moveable along the guide,
    wherein the tape advance mechanism and the control member are coupled to one another such that the tape advance mechanism is moveable in response to movement of the control member,
    wherein the tape advance mechanism includes a rotatable cam, a needle holder secured to the cam, and a needle secured to the needle holder such that the needle rotates with the cam.

21. A needle holder for a tape advance mechanism, the needle holder comprising:
    a body coupleable to the tape advance mechanism, the body including an opening positioned at a first end of the body, the opening for receiving a needle, wherein when a needle is positioned in the opening, a longitudinal axis of the needle and a longitudinal axis of the needle holder are parallel; and
    a grip at a second end of the body,
    wherein the second end of the body is opposite the first end of the body and is spaced from the first end of the body along the longitudinal axis of the needle holder.

22. The needle holder according to claim 21, wherein when a needle is positioned in the opening, the longitudinal axis of the needle and the longitudinal axis of the needle holder are coaxial.

23. The needle holder according to claim 21, wherein the body includes threads for coupling to a threaded opening of the tape advance mechanism.

24. The needle holder according to claim 21, wherein the needle holder further comprises a tip portion having two spaced cantilevers that define the opening.

* * * * *